United States Patent
Mills et al.

(10) Patent No.: US 10,180,871 B2
(45) Date of Patent: *Jan. 15, 2019

(54) STORAGE FAILURE PROCESSING IN A SHARED STORAGE ARCHITECTURE

(71) Applicant: NetApp Inc., Sunnyvale, CA (US)

(72) Inventors: Todd Mills, Union City, CA (US); Suhas Urkude, Pleasanton, CA (US); Kyle Sterling, San Francisco, CA (US); Atul Goel, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/161,870

(22) Filed: May 23, 2016

(65) Prior Publication Data

US 2016/0266957 A1    Sep. 15, 2016

Related U.S. Application Data

(63) Continuation of application No. 13/950,099, filed on Jul. 24, 2013, now Pat. No. 9,348,717.

(51) Int. Cl.
*G06F 11/07* (2006.01)
*G06F 11/20* (2006.01)

(52) U.S. Cl.
CPC ........ *G06F 11/079* (2013.01); *G06F 11/0727* (2013.01); *G06F 11/0751* (2013.01); *G06F 11/0793* (2013.01); *G06F 11/2094* (2013.01); *G06F 2201/805* (2013.01)

(58) Field of Classification Search
CPC . G06F 11/0709; G06F 11/0757; G06F 11/079

USPC ........................................................ 714/6.32
See application file for complete search history.

(56) References Cited

U.S. PATENT DOCUMENTS

| | | | |
|---|---|---|---|
| 3,950,729 A | 4/1976 | Fletcher | |
| 5,924,122 A | 7/1999 | Cardoza et al. | |
| 6,535,998 B1* | 3/2003 | Cabrera | G06F 11/1415 714/15 |
| 6,675,316 B1* | 1/2004 | Harper | G06F 11/203 711/135 |
| 7,373,542 B2 | 5/2008 | Bragulla et al. | |
| 8,713,356 B1* | 4/2014 | Chan | G06F 11/2247 714/6.1 |
| 2002/0049803 A1 | 4/2002 | Bandhole et al. | |
| 2002/0138704 A1* | 9/2002 | Hiser | G06F 11/1666 711/162 |

(Continued)

OTHER PUBLICATIONS

International Search Report and Written Opinion for Application No. PCT/US2014/047299 dated Nov. 20, 2014, 8 pages.

(Continued)

*Primary Examiner* — Kamini B Patel

(74) *Attorney, Agent, or Firm* — Cooper Legal Group, LLC

(57) ABSTRACT

The disclosed embodiments relate to systems and methods for coordinating management of a shared disk storage between nodes. Particularly, a messaging protocol may be used to communicate notifications regarding each node's perception of the shared storage's state. The nodes may use the messaging protocol to achieve consensus when recovering from a storage device failure. Some embodiments provide for recovery when localized failures, such as failures at an adapter on a node, occur.

20 Claims, 17 Drawing Sheets

(56) References Cited

U.S. PATENT DOCUMENTS

| | | | |
|---|---|---|---|
| 2002/0188590 A1* | 12/2002 | Curran | G01C 21/20 |
| 2003/0023811 A1* | 1/2003 | Kim | G06F 3/0601 |
| | | | 711/114 |
| 2004/0215640 A1 | 10/2004 | Bamford et al. | |
| 2005/0283658 A1* | 12/2005 | Clark | G06F 11/2028 |
| | | | 714/11 |
| 2006/0050629 A1 | 3/2006 | Saika | |
| 2006/0074940 A1* | 4/2006 | Craft | G06F 17/30194 |
| 2006/0143328 A1 | 6/2006 | Fleischer et al. | |
| 2006/0206671 A1* | 9/2006 | Aiello | G06F 3/0607 |
| | | | 711/148 |
| 2006/0212747 A1 | 9/2006 | Okamoto et al. | |
| 2007/0011136 A1* | 1/2007 | Haskin | G06F 21/41 |
| 2007/0073855 A1 | 3/2007 | Joshi et al. | |
| 2007/0260916 A1 | 11/2007 | Nguyen et al. | |
| 2008/0270823 A1* | 10/2008 | Hare | G06F 11/0709 |
| | | | 714/5.1 |
| 2009/0031167 A1 | 1/2009 | Onabe et al. | |
| 2009/0119538 A1 | 5/2009 | Scales et al. | |
| 2010/0232288 A1 | 9/2010 | Coatney et al. | |
| 2012/0144135 A1 | 6/2012 | Aronovich et al. | |
| 2013/0232379 A1 | 9/2013 | Aronovich et al. | |
| 2015/0033063 A1* | 1/2015 | Mills | G06F 11/2094 |
| | | | 714/6.3 |

OTHER PUBLICATIONS

Non-Final Office Action cited in U.S. Appl. No. 13/950,099 dated Apr. 13, 2015, 21 pgs.

Reply Non-Final Office Action cited in U.S. Appl. No. 13/950,099 dated Jul. 2, 2015, 12 pgs.

Final Office Action cited in U.S. Appl. No. 13/950,099 dated Oct. 15, 2015, 14 pgs.

Response after Final Office Action cited in U.S. Appl. No. 13/950,099 dated Dec. 11, 2015, 8 pgs.

Notice of Allowance cited in U.S. Appl. No. 13/950,099 dated Dec. 31, 2015, 15 pgs.

Notice of Allowance cited in U.S. Appl. No. 13/950,099 dated Jan. 25, 2016, 14 pgs.

* cited by examiner

STORAGE FAILURE PROCESSING IN A SHARED STORAGE ARCHITECTURE

RELATED APPLICATION

This application claims priority to and is a continuation of U.S. patent application Ser. No. 13/950,099, filed on Jul. 24, 2013 and titled "STORAGE FAILURE PROCESSING IN A SHARED STORAGE ARCHITECTURE", which is incorporated herein by reference.

FIELD OF THE INVENTION

Various of the disclosed embodiments relate to coordinating management of a shared storage between nodes, including failure processing.

BACKGROUND

A storage system may include one or more storage devices into which information may be entered, and from which information may be obtained. A storage operating system executed on the storage system may functionally organize the system by, e.g., invoking storage operations in support of a storage service implemented by the system. The storage system may be implemented in accordance with a variety of storage architectures including, but not limited to, a network-attached storage environment, a storage area network and a disk assembly directly attached to a client or host computer.

Storage systems commonly have a storage operating system, e.g., to respond to input/output requests and/or to perform housekeeping tasks associated with the storage systems on which they operate. The storage operating system of the storage system may implement a high-level module, e.g., a file system, to logically organize the information stored on the disks as a hierarchical structure of directories, files and/or blocks. One type of file system is a write-anywhere file system. An example of a write-anywhere file system that is configured to operate on a storage system is the Write Anywhere File Layout (WAFL®) file system available from Network Appliance, Inc., of Sunnyvale, Calif.

The storage system may be managed by a plurality of computing devices, referred to herein as "nodes." In many conventional storage systems an entire hard disk or solid state drive (SSD) is the smallest unit of capacity that could be provisioned to a node. In many systems that do not share storage devices (e.g., hard disks or SSDs), a single "owning" node may generally handle device failures. In these systems, the process of failing a disk may involve several blocks, e.g.: detecting a device error and deciding the severity; preventing further I/O to a failing disk while processing the error; deciding if any other related disk has also failed; recording the error in various system logs; failing the disk within a redundant array of independent disks (RAID) arrangement thereby causing a sick disk copy (SDC), or reconstruction to start; and, for severe (e.g., persistent) errors: recording the error persistently in case the system power cycles and the disk comes back healthy; and lighting the fault LED, or other indicator of error, on a drive enclosure. The final steps of recording the error persistently and lighting the fault LED on the drive enclosure may be signals to the system administrator to replace the disk.

Thus, prior systems which manage a plurality of storage devices with a single master node risk catastrophic failure with the failure or unavailability of the master node. There exists a need for more efficient management of one or more storage devices. Particularly, there exists a need for a system facilitating storage device management redundancy while harmonizing behavior across the entire system.

BRIEF DESCRIPTION OF THE DRAWINGS

One or more embodiments of the present disclosure are illustrated by way of example and not limitation in the accompanying figures, in which like references indicate similar elements.

DETAILED DESCRIPTION

Figure 1:
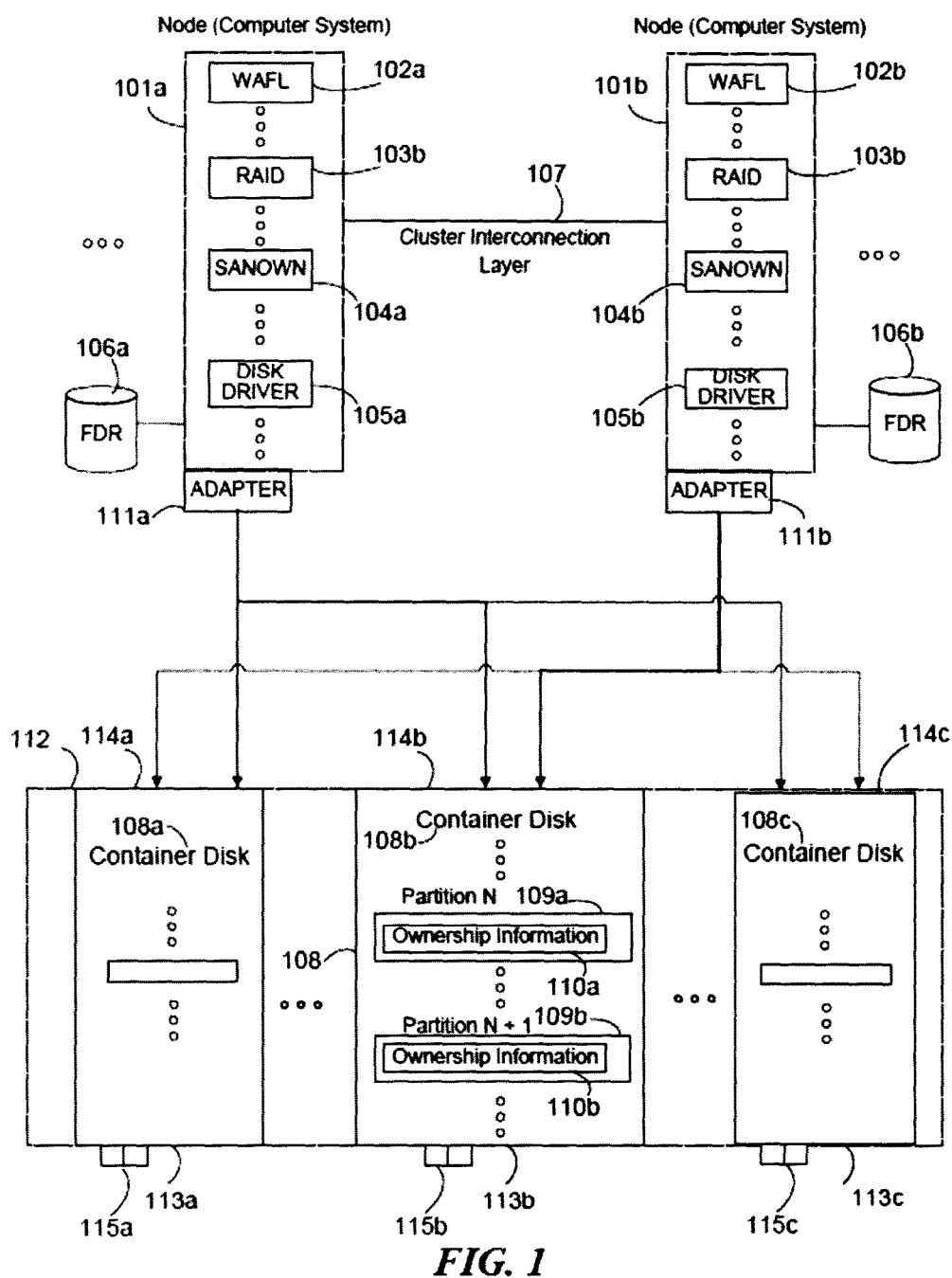
FIG. 1 is a block diagram illustrating a storage system as may be implemented in some embodiments.

The disclosed embodiments relate to systems and methods for coordinating management of a shared disk storage between nodes. Particularly, a messaging protocol may be used to communicate notifications regarding each node's perception of the shared storage's state. The nodes may use the messaging protocol to achieve consensus when recovering from a storage device failure. Some embodiments provide for recovery when localized failures, such as failures at an adapter on a node, occur.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Device System Overview

Various of the disclosed embodiments concern storage device management, where the storage device is shared between more than one node. In shared systems, the smallest unit of capacity may be a portion of a storage device rather than a whole storage device, referred to herein as a "partition". Sharing storage devices may improve storage efficiency in low-end systems which may have a limited number of disk slots. The cost of SSDs for low and mid-range systems may also make shared storage devices attractive. However, the sharing of storage devices may complicate a disk failing procedure at the nodes. For shared devices, it may be undesirable to signal the system administrator to remove the disk until both nodes have finished disk failure processing. Additionally, device failures detected by a first node may not be detected on a second node (e.g., because of a bad adapter, bad cable, bad storage switch, etc.). Also, the severity of a device failure detected by a first node may be different than that detected by a second node. The situation may be complicated as node to node intercommunication may be intermittent, so relaying messages exchanged between the nodes solely at the time of the failure may not be possible or practical.

Accordingly, various disclosed embodiments coordinate disk storage management of a shared disk storage between nodes ("the technology"). Particularly, a messaging protocol may be used to communicate notifications regarding each node's view of the state of the shared storage. The nodes may use the messaging protocol to achieve "consensus" when recovering from a storage device failure. Consensus may include, e.g., each node retaining a same or similar characterization of the storage device's current state. Some embodiments provide for recovery when localized failures, such as failures at an adapter on a node, occur.

FIG. 1 illustrates a generalized block diagram of a storage system as may be implemented in some embodiments. In these embodiments, nodes 101*a-b* may be computer systems configured to manage a plurality of storage devices 114*a-c*. Within each node 101*a-b* may be a plurality of interacting control layers. For example, a file control system, e.g. WAFL 102*a-b*, a redundant array of independent disks (RAID) configuration 103*a-b*, a software-based disk ownership (SANOWN) module 104a-b, and disk driver(s) 105a-b, may interact during management of one or more of the storage devices 114a-c (one will recognize these particular components are examples provided for explanation and that alternatives may be substituted providing similar functionality).

The nodes 101a-b may be in communication with fault disk registries (FDRs) 106a-b. An FDR generally refers to an on-disk database of state changes for one or more of the components. An FDR may be used by the system to log its progress during a recovery or management operation. In some instances, the FDR may be an "intent log" in that it is used to record the motivation for performing a particular action. Generally, the FDRs may be used to store state information so that operations may be completed following a system failure. For example, in some embodiments if Node A has reached block three of a five block process and then fails, upon rebooting Node A may refer to the FDR and continue recovery at block four. Thus the FDR may record intermediate and final states during a disk failure detection and/or recovery. In some embodiments, each FDR 106a-b is a mirror copy of one another. In some embodiments, the FDR is stored in the root aggregate.

A cluster interconnection layer 107 may be used to facilitate interaction and communication between nodes 101a-b. For example, the layer 107 may be a direct or a networked connection, e.g., an Ethernet connection between the storage nodes 101a-b and may be used to synchronize information between the nodes. Each node may also be in communication with a container disk 108a-c stored on the storage device 114a-c. Each container disk 108a-c, may contain data indicating the correspondence between partitions 109a-b of the various storage devices 114a-c and the respective ownership information 110a-b for each node 101a-b. For example, node 101a may manage partitions on storage devices 114a-b, while node 101b may manage partitions on storage devices 114b-c. In some embodiments, the SANOWN layer 104a manages the container disks 108a-c.

Nodes 101a-b may communicate with one or more storage devices 114a-c via adapters 111a-b. Storage devices 114a-c may be any storage system capable of storing data, e.g., hard drive disks, SSDs, etc. The storage devices 114a-c may be organized into a plurality of logical units (LUNs). Each storage device 114a-c may be housed in a respective storage bay 113a-c that may themselves be housed in a storage rack 112. The storage bays 113a-c or the storage devices 114a-c themselves may include indicators 115a-c, e.g. light emitting diodes (LEDs), to indicate the state of the storage device 114a-c. For example, if the storage device 114a is in a failed state, then the indicator 115a may flash red.

Device failure handling may involve five software components within some of the disclosed embodiments. The components may include a Storage Disk Layer (disk) configured for all interactions between Clustered Data ONTAP® software components and random-access devices (e.g., hard disks and SSDs). The components may also include a Storage Partition Module implemented as a component of the storage disk layer configured to convert a physical device and its storage capacity into a container disk and its storage capacity divided into partitions. The components may include SANOWN configured to manage a disk ownership module (e.g., to decide which node has write access to a disk or a partition), e.g. SANOWN modules 104a-b. A RAID configuration, e.g. a RAID configuration 103a-b, may be configured to handle disk failures by performing a SDC or reconstructing data to a replacement disk from the remaining members of a redundant RAID group. A RAID LM may be responsible for overseeing the health of disks from the perspective of both nodes, and making RAID layout decisions when a disk fails non-persistently from one node, but not the other. The disk, SANOWN, and RAID layers may independently detect disk failures and may initiate disk failure handling.

Lastly, some of the disclosed embodiments use the following categories for device errors: a "disk missing error" indicates a loss of connection between the node and a device; a "persistent fatal error" indicates a severe error preventing further use and future use of the device; a "non-persistent fatal error" preventing further use of the device until the error is corrected by a system administrator; a "communications failure" indicating a faulty adaptor or interconnection; and a "recommend failure" indicating that a device has exceeded an error threshold and should be taken out of service.

Disk Partition State Transition Diagram

Figure 2:
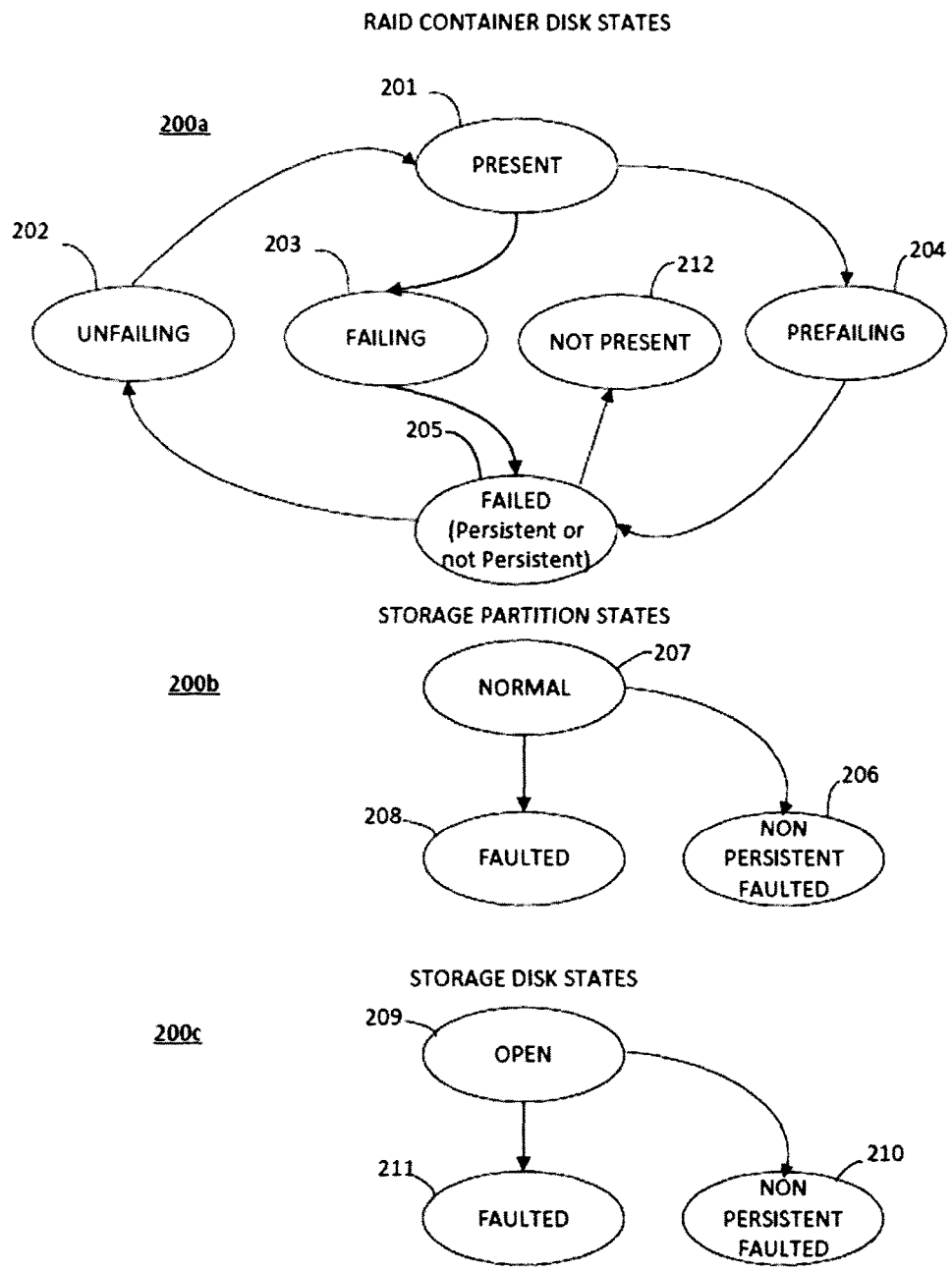
FIG. 2 is a transition diagram illustrating transitions for several component levels as may be implemented in some embodiments.

FIG. 2 is a state transition diagram 200 illustrating transitions for several component levels as may be implemented in some embodiments. With regard to the RAID container disks 200a, in some embodiments the RAID configuration may transition from a PRESENT state 201 to a FAILING state 203 and from FAILING 203 to either a PERSISTENT_FAILED or a NON_PERSISTENT_FAILED state 205. From the FAILED state 205 the configuration may transition to a NOT PRESENT state 212 (e.g., when the disk was removed).

Transitions between the states may occur with increasing degrees of failure severity or character. For example, a node may initially consider a container disk to be in a normal, present state 201. Following detection of an error on the container disk, a node may transition its container disk to a failing state 203. Once the failure has been confirmed, possibly via communication with another device or following completion of the local failure processing operations, the node may transition the partition to a failed state 205. If the failure is intermittent, or irreproducible, the node may further transition the device or partition to the non-persistent-faulted state 206 or 210.

Also depicted in FIG. 2 are possible states of a storage partition 200b and storage disk 200c. In some embodiments, a storage partition may transition from a NORMAL 207 state to a FAULTED state 208 or a NON-PERSISTENT FAULTED state 206. In some embodiments, a storage disk may transition from a NORMAL 209 state to a FAULTED state 211 or a NON-PERSISTENT FAULTED state 210.

In some embodiments the device state is maintained on the disk partition. In some embodiments, the failing and prefailing states are always recorded in the FDR, though an administrator may elect not to perform some recordations to improve efficiency.

Persistent Failure—Partition Examples

Figure 3:
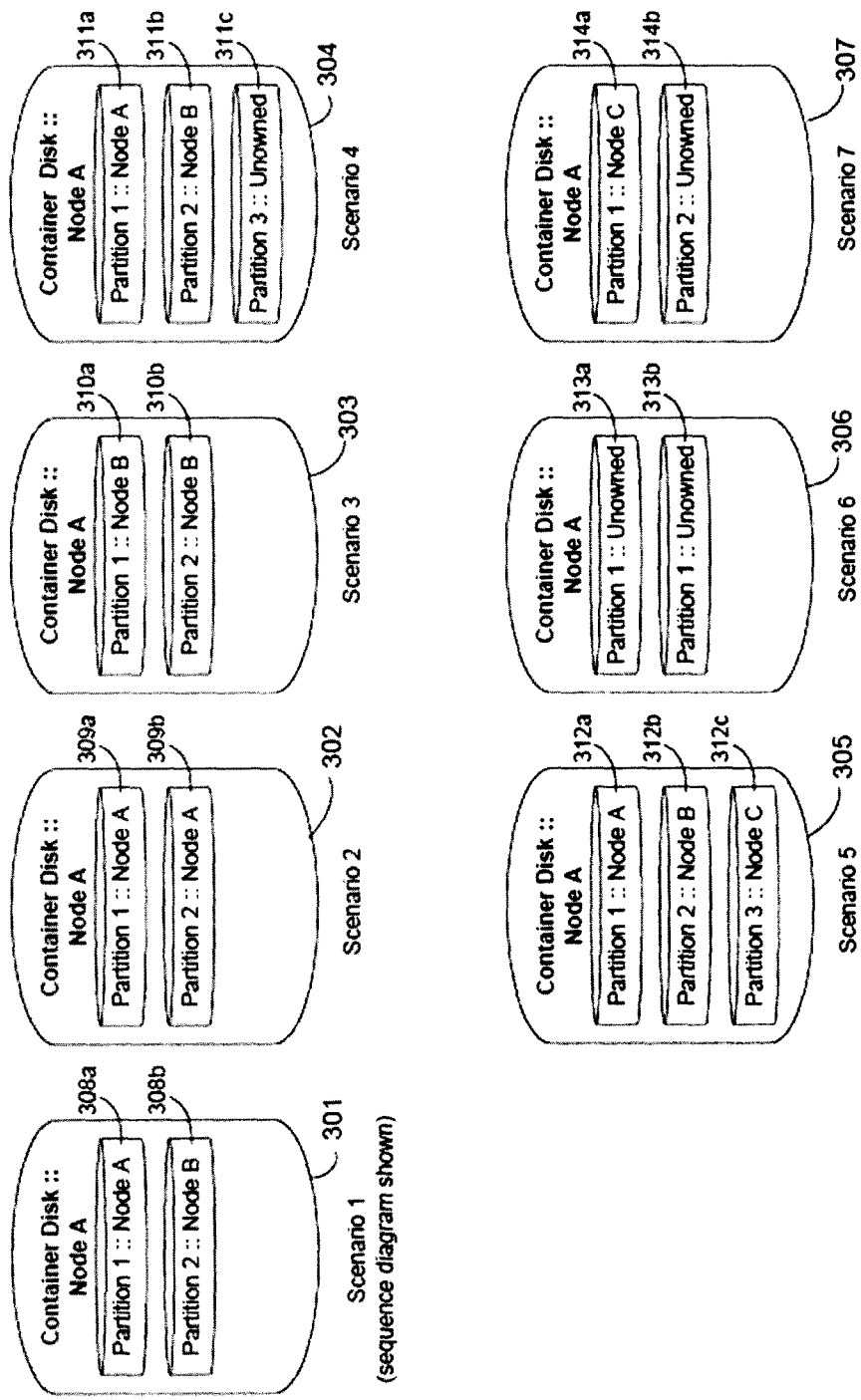
FIG. 3 is a plurality of partition states in a storage device as may occur during a persistent failure in some embodiments.

FIG. 3 is a plurality of partition states in a storage device as may occur during a persistent failure in some embodiments.

Figure 4:
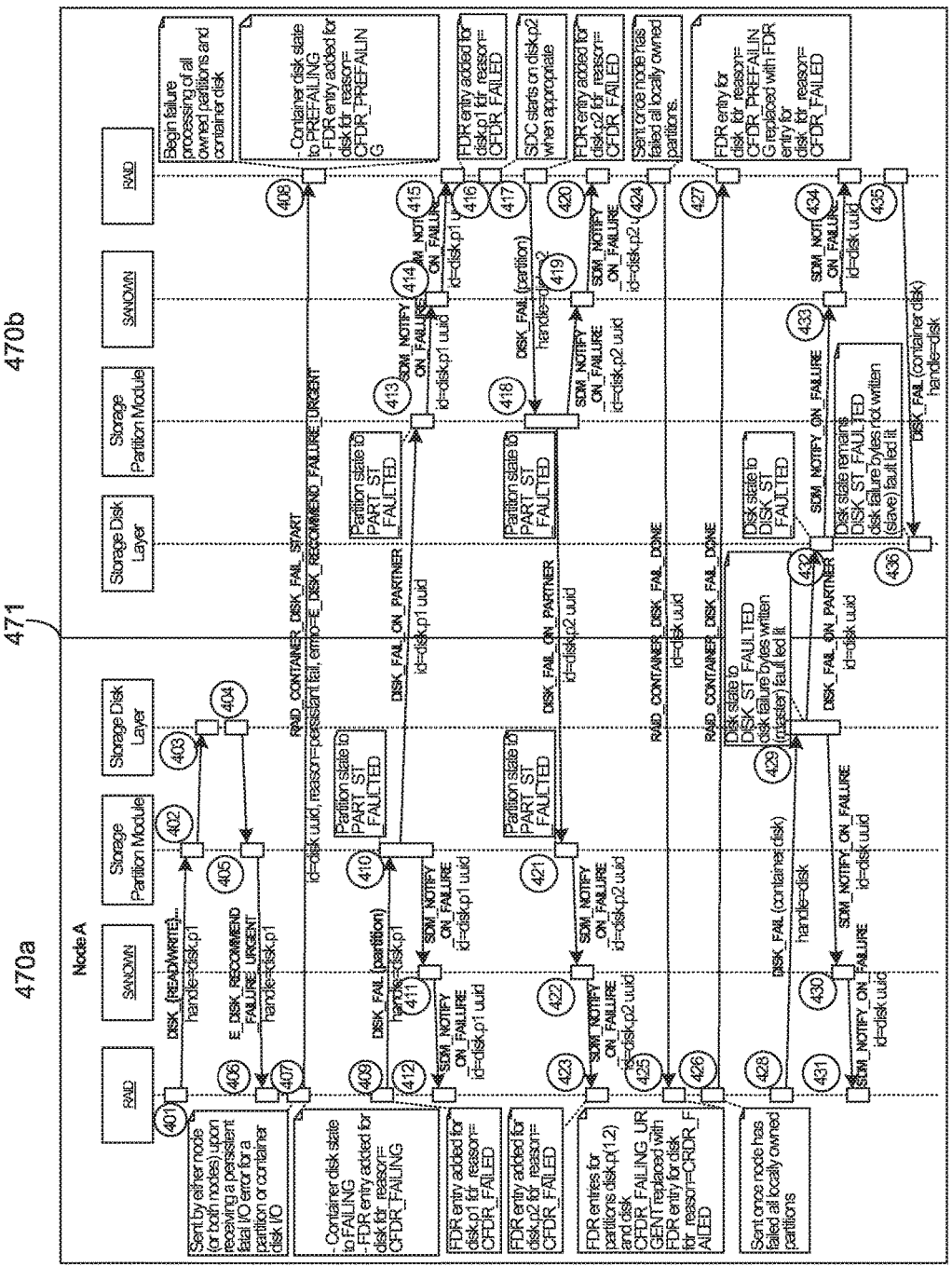
FIG. 4 is a sequence diagram illustrating a portion of a process for handling a persistent disk failure at a shared storage device as may be implemented in some embodiments.
Figure 5:
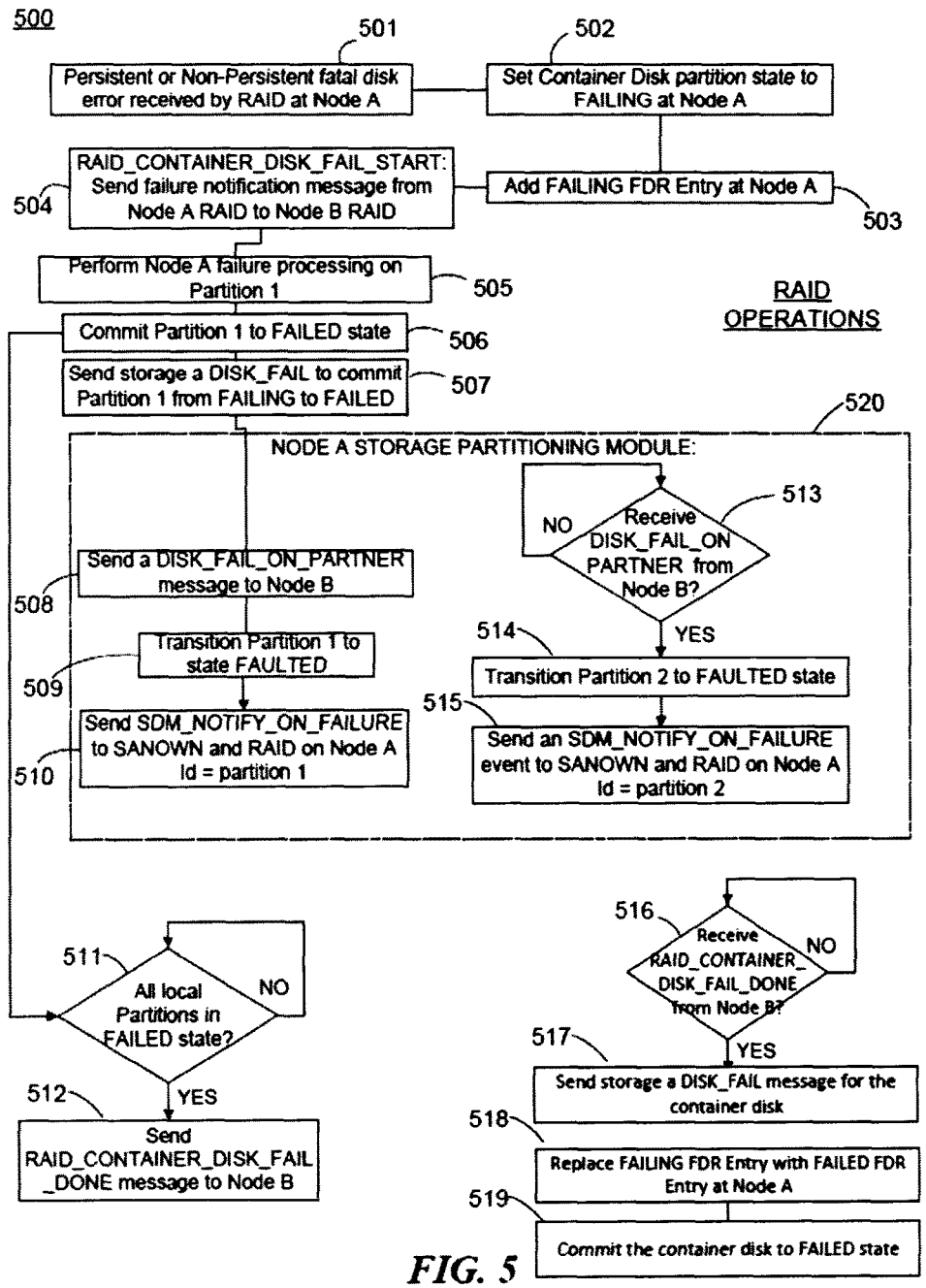
FIG. 5 is a flow diagram illustrating some operations in an initiating node during the disk failure handling of FIG. 4 as may be implemented in some embodiments.
Figure 6:
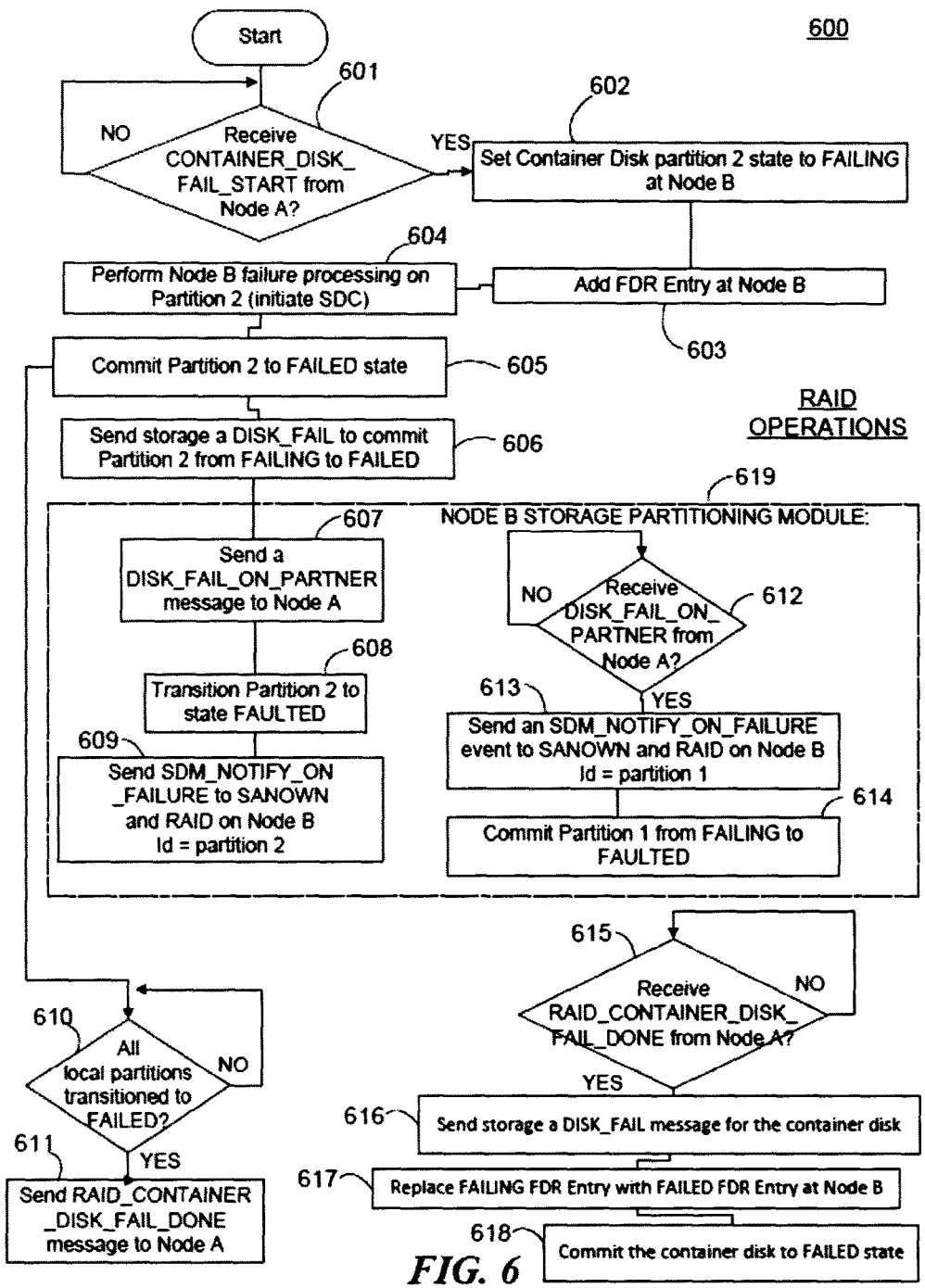
FIG. 6 is a flow diagram illustrating some operations in a receiving node during the disk failure handling of FIG. 4 as may be implemented in some embodiments.

In Scenario 1, the container disk 301, managed at Node A, has a first partition 308a managed by Node A and a second partition 308b managed by Node B. The examples of FIGS. 4-6 are given with respect to Scenario 1. Here, the container disk 301 is managed by Node A 101a.

In Scenario 2, the container disk 302, managed at Node A, has a first partition 309a managed by Node A and a second partition 309b also managed by Node A.

In Scenario 3, the container disk 303, managed at Node A, has a first partition 310a managed by Node B and a second partition 310b managed by Node B.

In Scenario 4, the container disk 304, managed at Node A, has a first partition 311a managed by Node A, a second partition 311b managed by Node B, and a third partition 311c which is not managed.

In Scenario 5, the container disk 305, managed at Node A, has a first partition 312a managed by Node A, a second partition 312b managed by Node B, and a third partition 312c which is managed by Node C.

In Scenario 6, the container disk 306, managed at Node A, has a first partition 313a which is not managed and a second partition 313b which is not managed.

In Scenario 7, the container disk 307, managed at Node A, has a first partition 314a managed by Node C and a second partition 314b which is not managed.

One will readily recognize additional partition configurations addressed by the embodiments discussed in greater detail herein.

Example System Messages

Some embodiments contemplate a message, indicated herein by the identifier RAID_CONTAINER_DISK_FAIL_START, which may be sent from a RAID instance on a first node to a RAID instance on a different node, e.g., a partner node. In some embodiments, this message may be the first communication in a protocol used by a RAID instance to coordinate disk failure processing for shared disks. The message may be sent when a persistent or non-persistent fatal disk error was received by a RAID instance from storage. In some embodiments, the message recipient uses the parameters of the message to decide the recovery actions to be taken and begin failure processing of locally owned partitions. In some embodiments, a disk failure event may result in one or both nodes sending this message.

In some embodiments, escalating disk errors may result in multiple RAID_CONTAINER_DISK_FAIL_START messages being transmitted before completion of the protocol. The RAID_CONTAINER_DISK_FAIL_START message may include several parameters. In some embodiments, the message may include an identifier, e.g. UUID, of the container disk, reason of the failure, and an error number reported by a storage device. In some embodiments, the message may include a timestamp of the failure to coordinate logs for each node.

Some embodiments employ a message indicating that a RAID failure is complete, indicated herein by the identifier RAID_CONTAINER_DISK_FAIL_DONE. This message may be sent from a RAID instance on a node to a RAID instance on the partner node (e.g. from Node A's RAID instance to Node B's RAID instance). This message may be a communication in a protocol used by RAID to coordinate disk failure processing for shared disks. This message may be sent after failure processing has completed by RAID for all locally owned partitions. In some embodiments, the message recipient uses the message to indicate the partner RAID instance has completed failure processing of all partner owned partitions. The message may include several parameters, e.g., an identifier UUID of the container disk and a timestamp indicating the nodes' completion of failure processing.

Some embodiments include a message, indicated herein by the identifier RAID_CONTAINER_DISK_UNFAIL_START, to indicate the beginning of an unfail process. The message may be sent from a RAID instance on a node to a RAID instance on the partner node. The message may be used in a communication protocol by one or more RAID instances to coordinate unfailing a shared disk. The message may be sent by a node to unfail a container disk. This message may be sent by either node in the node pair, e.g. by Node A or by Node B, whether the initiator or the receiver.

In some embodiments, the RAID_CONTAINER_DISK_UNFAIL_START message may include several parameters. For example, the message may include an identifier, e.g. UUID, of the container disk. The message may also include a timestamp of when the unfail process began or was requested to coordinate logs for each node.

Some embodiments contemplate a message, indicated by the identifier RAID_CONTAINER_DISK_UNFAIL_DONE, which may indicate the completion of an unfail process. This message may be sent from a RAID instance on a node to a RAID instance on the partner node. This message is a communication in a protocol used by RAID to coordinate unfailing a shared disk. The message may be sent when a shared disk unfail operation is complete. This message may be sent by either node in the pair, e.g. by Node A or by Node B, whether the initiator or the receiver of the communication.

In some embodiments, the RAID_CONTAINER_DISK_UNFAIL_DONE message may include several parameters. For example, the message may include an identifier, e.g. UUID, of the container disk. The message may include additional parameters, e.g. a timestamp indicating when the unfail process began or was requested to coordinate logs for each node.

Some embodiments contemplate a message, indicated by the identifier SDM_NOTIFY_ON_FAILURE, which may be used by a storage disk layer to indicate a transition to a faulted state for a partition, container disk, or physical disk following a storage partitioning module initiated event. In some embodiments, RAID uses this event to record FDR entries for partner failed partitions. In some embodiments, RAID may also use the event to initiate recovery actions for partitions and container disks when a transition resulted from a SANOWN or storage initiated disk failure.

In some embodiments, the storage disk layer and storage partitioning module may be responsible for communicating this event on both the local and partner nodes for a partition, container disk, or physical disk. The message may include a variety of parameters, e.g., UUID of the partition, container disk, or physical disk.

Some embodiments contemplate a message, indicated herein by the identifier SDM_NOTIFY_ON_NON_PERSISTENT_FAILURE which may indicate a transition to a Non PersistentFaulted state for a partition, container disk, or physical disk. The message may be initiated by a storage disk layer and/or storage partitioning module.

RAID instances may use this event to initiate recovery actions for partitions and container disks when a transition resulted from a SANOWN or storage initiated disk failure. The storage disk layer and storage partitioning module may be responsible for communicating this event on the local node for a partition, container disk, or physical disk. The message may include a variety of parameters e.g., UUID of the partition, container disk, or physical disk.

After receiving a fatal persistent error, in some embodiments, a RAID instance may send a message indicated herein by the identifier RAID_CONTAINER_DISK_FAIL_START. The message may be used to inform the partner node of a container disk failure and to ensure that the partner is aware of the container disk state in case of takeover. The message may also be used to direct nodes to individually fail locally owned partitions after performing appropriate recovery actions (e.g., SDC), and recording FDR entries. The message may also be used to direct the storage disk layer and storage partitioning module which are responsible for communicating transitions of physical disks, container disk, and partitions to Faulted and Non PersistentFaulted to both the local and partner nodes using, e.g. a SDM_NOTIFY_ON_FAILURE message.

In some embodiments, both nodes may send a RAID_CONTAINER_DISK_FAIL_DONE message after failing locally owned partitions to inform the partner of the container disk state in case of takeover. This may be true even in cases where the node has no partitions assigned or is unaware of a container disk due to path failures. In some embodiments, storage may fail a partitioned disk (e.g., light the fault LED, write failure bytes, etc.) from a node after all locally owned partitions and container disk have transitioned to a Faulted state.

In some embodiments, both nodes in a node pair may fail the disk, only the container disk master writes failure bytes, but both a partitioned disk failure from either node results in the fault LED becoming lit. In some embodiments, the node interconnect communication failures during disk error processing may be handled in a container disk state machine.

Persistent Failure Communication Example

FIG. 4 is a sequence diagram illustrating a portion of a process for handling a persistent disk failure at a shared storage device as may be implemented in some embodiments. As will be understood, all the sequence diagrams provided herein may generally depict events occurring later in time further down the figure, though this need not always be the case. In all the sequence diagrams, the cluster interconnect between Nodes A and B may be represented by the vertical line 471. Similarly, each block in the diagram may represent an activation line. Although particular message titles are provided in the sequence diagrams to facilitate explanation, one will readily understand that any arbitrary title may be used and that the titles indicated herein are only generally correlated with the information they convey. Thus, a message represented by one title in the diagrams may be implemented as more than one message and vice versa. Furthermore, for ease of representation, one will recognize that reference to the disk refers to the storage device, which may be a hard disk, SSD, etc. Particular partitions on the disk, for example the partitions 1 and 2 of Scenario 1, may be referred to in the diagram by disk.p1 and disk.p2 respectively. Thus, as depicted in FIG. 4, partition 1 of Scenario 1 may be set to faulted at 410 in Node A and partition 2 of Scenario 1 may be set to faulted at 421 in Node A. Partition 1 may be set to faulted at 413 in Node A and partition 2 may be set to faulted at 418 in Node B. One will recognize that certain of the depicted blocks may be omitted and/or reordered. For example, although this and other figures indicate instances where each node may record their progress in an FDR, one will recognize that such recordations need not happen at the depicted time nor in the depicted order. Rather, the depicted recordations in the FDR are merely exemplary, An actual implementation, may, e.g., omit the FDR recordation at block 416, but retain the recordation at block 427 to improve efficiency.

The RAID_CONTAINER_DISK_FAIL START from block 407 to block 408 may be sent by either, or both, nodes upon receiving a persistent fatal I/O error for a partition or container disk I/O. At this time, the node may transition the container disk state to failing and add an FDR entry.

At 408 Node B may begin failure processing of all owned partitions and the container disk. Node B may set the container disk state to failing and create an FDR entry.

Following completion of their respective failing operations (e.g., copying data from their partitions to a safe backup location), the nodes may perform a handshake at blocks 424-427 to confirm that the container disk may be taken offline and replaced.

Persistent Failure Communication Example—Initiating Node Perspective

FIG. 5 is a flow diagram illustrating some operations in an initiating node (e.g. Node A in Scenario 1 of FIG. 3) during the disk failure handling of FIG. 4 as may be implemented in some embodiments. In the example of FIG. 5, certain blocks are depicted as occurring as part of RAID operations (blocks outside region 520), and other blocks as part of the NODE A storage partitioning module (blocks within region 520). Additionally, certain blocks are depicted as separate processes, though one will recognize that this need not be the case (e.g., 501-512 may refer to a single process, while blocks 513-515 and blocks 516-519 refer to separate concurrent processes).

At block 501, Node A may receive a persistent or non-persistent fatal disk error at its RAID component. This may correspond to the interactions 401-406.

At block 502, Node A may set the container disk partition state to FAILING for Node A. For example, having detected an error on the container disk, Node A may have resolved to bring down the disk.

At block 503, Node A may enter a "FAILING" FDR entry. As explained elsewhere, however, FDR entries are not required by the system and the number and choice of entries may be determined based on an administrator's consideration of desired efficiency vs. recovery protection.

At block 504, Node A may send a "RAID_CONTAINER_DISK_FAIL_START" notification to Node B. At this time, Node B may be unaware of any problems with the disk. For example, a failure in the disk head may affect partitions assigned to Node A, but not to Node B.

At block 505, Node A may perform failure processing on Partition 1. For example, the node may begin moving data from the partition to a safe location, anticipating the disk's removal.

At block 506, Node A may commit Partition 1 from a failing state to a failed state. This may be performed, in part, by sending a DISK_FAIL message to storage at block 507.

Blocks 508, 509, 510, 513, 514, and 515 may be performed at Node A's storage partitioning module 507. At block 508, Node A may send a message to Node B indicating a partner failure.

At block 509, Node A may transition Partition 1 to a FAULTED state.

At block 510, Node A's RAID and SANOWN configurations may be notified of the failure.

Concurrently or sequentially, following the commission of partition 1 to a failed state at block 506, at block 511, Node A may determine that all the local partitions are in a failed state. Local partitions may be partitions with ownership information indicating the partition is owned by the local node (e.g., the node attempting to access the partition). Partitions owned by the partner node may be referred to as partner partitions herein. Partitions owned by none of the nodes, e.g., because they have not been assigned, may be referred to herein as unowned.

Once all the local partitions are in a failed state, at block 512 Node A may send a RAID_CONTAINER_DISK_FAIL_DONE message to Node B, indicating that the operation is complete. In this manner, Node B will be apprised that Node A's corrective procedures have completed.

At block 513, possibly in a separate process, Node A may wait to receive a DISK_FAIL_ON_PARTNER message from Node B.

At block 514, Node A may transition partition 2 to a FAULTED state.

At block 515, Node A may send an SDM_NOTIFY_ON_FAILURE message to SANOWN and RAID on Node A, indicating the second partition via an id.

At block 516, possibly in a separate process, Node A may also anticipate a "handshake" completion operation with Node B. The handshake may confirm that both Nodes have completed their respective data preservation operations and are prepared for the disk to be removed and replaced. At block 516, Node A may receive a RAID_CONTAINER_DISK_FAIL_DONE message from Node B.

At block 517, Node A may send a DISK_FAIL message for the container disk. At block 518, Node A may also supersede the FAILING entry in the FDR with a FAILED entry. At block 519, Node A may also commit the container disk to a FAILED state.

Those skilled in the art will appreciate that the logic illustrated in FIG. 5 and described above, and in each of the flow and sequence diagrams discussed herein, may be altered in a variety of ways. For example, the order of the logic may be rearranged, sub-blocks may be performed in parallel, illustrated logic may be omitted, other logic may be included, etc.

While the flow and sequence diagrams presented herein show an organization designed to make them more comprehensible by a human reader, those skilled in the art will appreciate that actual data structures used by the facility to store this information may differ from what is shown, in that they, for example, may be organized in a different manner; may contain more or less information than shown; may be compressed and/or encrypted; etc.

Persistent Failure Communication Example—Receiving Node Perspective

FIG. 6 is a flow diagram illustrating some operations in a receiving node, e.g. Node B in Scenario 1 of FIG. 3, during the disk failure handling of FIG. 4 as may be implemented in some embodiments. As in FIG. 5 above, reference below to partition 1 or 2 may refer to partitions 1 or 2 in Scenario 1 of FIG. 3. Similarly, though some collections of blocks are depicted separately to indicate separate and/or concurrent processes (e.g., blocks 601-611).

At block 601 Node B may determine whether it has received a fail start notification from Node A, for example, a port on Node B may be open and receive messages from Node A via the Cluster Interconnection layer 107. Note that Node B may have no reason to suspect a failure on the container disk at this time, but may remain in communication with Node A anticipating a communication from Node A reporting such difficulties. The received fail start notification may be the same as the notification sent at block 503 of FIG. 5 in some embodiments.

Once the notification is received, at block 602 Node B may set its container disk partition to a FAILING state.

At block 603, Node B may add an FDR entry indicating the transition to a FAILING state. As discussed elsewhere, the FDR entry is discretionary in some embodiments, and may be avoided altogether in some instances.

At block 604, Node B may perform failure processing on Partition 2. For example, Node B may initiate the disk copy (SDC). The disk copy may move files from the partitions of the failing device to a safe backup location.

At block 605, Node B may commit partition 2 to a FAILED state.

At block 606, Node B may send the storage system a DISK_FAIL message to commit partition 2 from FAILING to FAILED.

Blocks 607-609, 612-614 may be performed at Node A's storage partitioning module 606 rather than part of the RAID configuration in some embodiments. At block 607, Node B may send a DISK_FAIL_ON_PARTNER message to Node A. This may be the message received, e.g., at block 511 of FIG. 5 in some embodiments.

At block 608, Node B may transition partition 2 to a FAULTED state.

At block 609, Node B may send an SDM_NOTIFY_ON_FAILURE message to the SANOWN and RAID on Node B, indicating the partition as the second partition.

Concurrently or sequentially, following the commission of partition 1 to a failed state at block 605, at block 610, Node B may determine whether all local partitions have transitioned to FAILED. Once all local partitions have transitioned to FAILED, at block 611 Node B may send a message to Node A indicating that the failing of the disk is complete.

At block 612, possibly in a separate process, Node B may wait to receive a DISK_FAIL_ON_PARTNER message from Node A. At block 613, Node B may send an SDM_NOTIFY_ON_FAILURE event to SANOWN and RAID on Node B (indicating partition 1 via id=1). At block 614, Node B may commit partition 1 from FAILING to FAULTED.

At block 615, possibly in a separate process, Node B may also anticipate a "handshake" completion operation with Node A. As discussed above, the handshake may confirm that both Nodes have completed their respectively data preservation operations and are prepared for the disk to be removed and replaced. At block 616, Node B may send a DISK_FAIL message for the container disk. At block 617, Node B may replace the FAILING FDR entry with a FAILED FDR Entry at Node A. Finally, at block 618, Node B may commit the container disk to a FAILED state.

Persistent Failure Communication Example—Additional Scenarios

With regard to Scenario 2 of FIG. 3, Node A may perform a similar set of steps as is shown in the sequence diagram of FIG. 4 and the flow diagram of FIG. 5, with the additional steps of failing partition 2 as is done with partition 1. Additionally, in some embodiments, Node B may perform an FDR update for the container disk upon receiving a RAID_CONTAINER_DISK_FAIL_START message. Since Node B is not assigned any partitions in this scenario, Node B may send Node A a RAID_CONTAINER_DISK_FAIL_DONE message after receiving the RAID_CONTAINER_DISK_FAIL_START message. Node B may perform FDR updates for partitions as SDM_NOTIFY_ON_FAILURE events are received from Node A. Node B may send storage a DISK_FAIL message after receiving RAID_CONTAINER_DISK_FAIL_DONE from Node A.

With regard to Scenario 3 of FIG. 3, in this scenario Node A owns no partitions, but may receive a fatal persistent error when accessing the container disk. Node A may send a RAID_CONTAINER_DISK_FAIL_START message to Node B after adding the container disk FAILING entry to the FDR. Since Node A owns no partitions in this scenario, Node A may initiate the RAID_CONTAINER_DISK_FAIL_DONE message to Node B. Node B may perform DISK_FAIL messages after attempting SDC for partitions 1 and 2.

After failing both partitions, Node B may send Node A a RAID_CONTAINER_DISK_FAIL_DONE message and send a DISK_FAIL message to storage since the RAID_

CONTAINER_DISK_FAIL_DONE was already received. Upon receiving RAID_CONTAINER_DISK_FAIL_DONE, Node A may send a DISK_FAIL message for the container disk to storage.

With regard to Scenario 4 of FIG. 3, the sequence diagram may be the same for this scenario as Scenario 1. In some embodiments, the sequence diagram for Scenario 4 may differ from Scenario 1 in that the storage partition module does not receive a DISK_FAIL (partition) message from RAID for partition 3, due to RAID not being aware of the partition. In addition, the storage disk layer may allow the container disk to be faulted without receiving a DISK_FAIL message for the unowned partition.

With regard to Scenario 5 of FIG. 3, the sequence diagram for this scenario may be the same as Scenario 1. In some embodiments, the same exceptions discussed in Scenario 4 for unowned partitions may apply to third party owned partitions, e.g. partition 312c.

With regard to Scenario 6, in some instances RAID operations performed on the container disk may result in this scenario. In this case, Node A may write an FDR entry for FAILING the container disk. Node A may also send a RAID_CONTAINER_DISK_FAIL_START message to Node B. Node A may also send a RAID_CONTAINER_DISK_FAIL_DONE message to Node B. In some embodiments, Node B may write an FDR entry for container disk FAILING after the RAID_CONTAINER_DISK_FAIL_START is received. Node B may also send a RAID_CONTAINER_DISK_FAIL_DONE message to Node A. Upon receiving the RAID_CONTAINER_DISK_FAIL_DONE message from Node A, Node B may replace the FAILING FDR entry with a FAILED FDR entry for the container disk.

Node B may also send a DISK_FAIL (container disk) message to storage. Upon receiving the RAID_CONTAINER_DISK_FAIL_DONE message from Node B, Node A may replace the FAILING FDR entry to a FAILED FDR entry for the container disk. Node A may also send a DISK_FAIL (container disk) message to storage.

With regard to Scenario 7 of FIG. 3, the sequence for this scenario may be the same as for Scenario 6.

One will recognize that the RAID_CONTAINER_DISK_FAIL_START message may be used to allow both nodes to FAIL partitions even if the partner is not performing I/O to the failed disk. The RAID_CONTAINER_DISK_FAIL_DONE? message may also inform each node that its partner has finished failing its assigned partitions, ensuring that the associated fault indicators are activated only after both nodes have finished processing the failure.

SANOWN Initiated Disk Failure Handling Example—Scenarios

Figure 7:
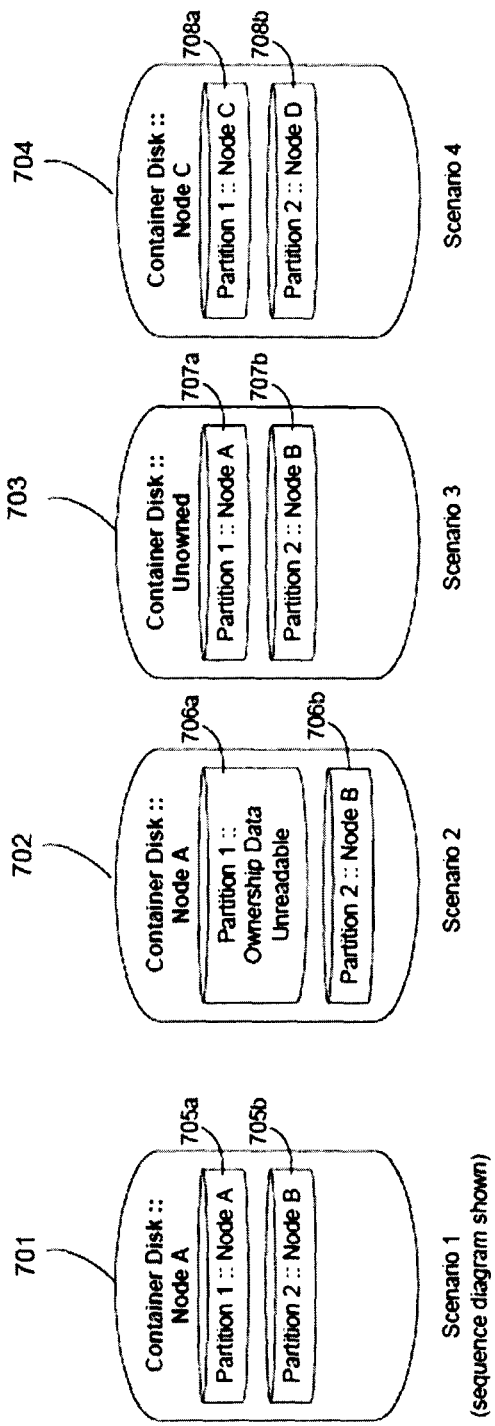
FIG. 7 is an illustration of a plurality of partition states in a storage device as may occur in some embodiments during a Software-Based Disk Ownership (SANOWN) initiated disk failure handling as implemented in some embodiments. Though SANOWN specifically is referred to here for purposes of explanation, one will recognize that a system which manages storage device ownership may be used.

FIG. 7 is an illustration of a plurality of partition states in a storage device as may occur in some embodiments during a SANOWN initiated disk failure handling.

In Scenario 1, the container disk 701 managed by Node A, indicates a first partition 705a owned by Node A and a second partition 705b owned by Node B.

In Scenario 2, the container disk 702, also managed by Node A, indicates a first partition 706a which is unowned and a second partition 706b owned by Node B.

In Scenario 3, the container disk 703, which is managed by neither Node A nor Node B may indicate a first partition 707a owned by Node A and a second partition 707b owned by Node B.

In Scenario 4, the container disk 704, which may be managed by a third Node C (not illustrated in FIG. 1) indicates a first partition 708a owned by Node C and a second partition 708b owned by Node D.

One will readily recognize additional partition configurations addressed by the embodiments discussed in greater detail herein.

SANOWN Initiated Disk Failure Handling Example—Scenario 2 in FIG. 3

Figure 8:
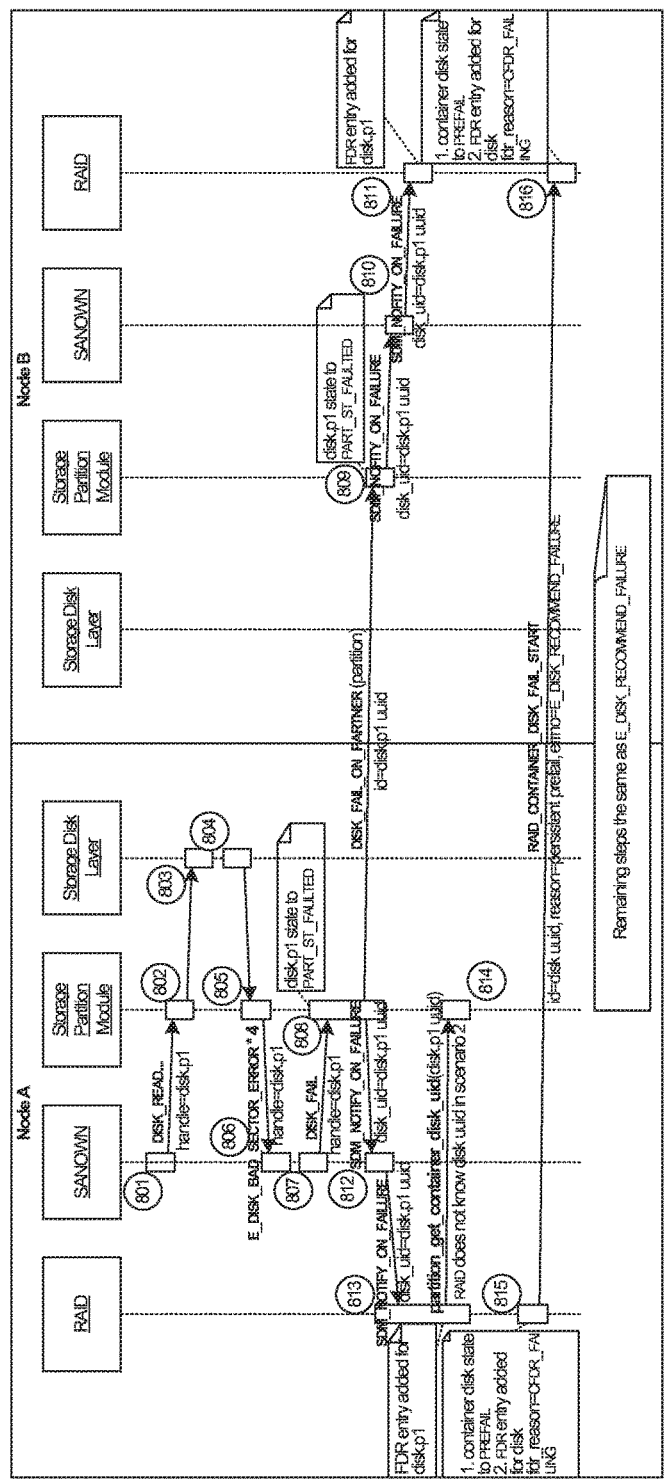
FIG. 8 is a sequence diagram illustrating a portion of a process for handling a SANOWN disk failure at a shared storage device as may be implemented in some embodiments.

FIG. 8 is a sequence diagram illustrating a portion of a process for handling a SANOWN disk failure at a shared storage device as may be implemented in some embodiments. The depicted example is based on Scenario 1 of FIG. 7.

In some embodiments, the SDM_NOTIFY_ON_FAILURE message may be used to inform a RAID instance of an unrecoverable partition failure detected by SANOWN or the storage layer. The RAID instance may use this event to pre-fail all other partitions of the disk. In some embodiments, without this event, a partition may be failed in SANOWN during file boot before informing RAID. In this situation, RAID may not know to SDC the remaining partitions (See, e.g., Scenario 2).

SANOWN Initiated Disk Failure Handling Example—Additional Scenarios

Although FIG. 8 is presented with respect to Scenario 1 of FIG. 7, various embodiments also contemplate addressing the other Scenarios of FIG. 7.

For example, with regard to Scenario 2 of FIG. 7, Node A may perform several operations. Node A's SANOWN instance may report the container disk to RAID as local/native disk. In some embodiments, Node A's SANOWN may report partition 2 to RAID as partner/native disk. The SANOWN instance of Node A may send a DISK_FAIL message to storage partition module after failing to read the DOWNs data for partition 1. The storage partition module may send an SDM_NOTIFY_ON_FAILURE event to SANOWN and RAID to indicate that partition 1 failed. In some embodiments Node A's storage partition module may send a DISK_FAIL_ON_PARTNER message to Node B indicating partition 1 failed. In some embodiments, Node A's RAID instance may send Node B's RAID instance a RAID_CONTAINER_DISK_FAIL_START message to recommend failure of the container disk.

Node B's RAID instance may send Node A's RAID instance a RAID_CONTAINER_DISK_FAIL_DONE message since all owned partitions have been failed. Node A's RAID instance may then send storage a DISK_FAIL message for the container disk upon receiving a RAID_CONTAINER_DISK_FAIL_DONE message from Node B.

With respect to Node B in Scenario 2, in some embodiments, Node B's SANOWN instance may report the container disk to RAID as a partner/native disk. Node B's SANOWN instance may report partition 2 to Node B's RAID instance as a local/native disk.

In some embodiments the storage partition module may send an SDM_NOTIFY_ON_FAILURE event to SANOWN and RAID to indicate partition 1 failed upon receiving the DISK_FAIL_ON_PARTNER message from Node A. The RAID instance may record the partition 1 failure in the FDR upon receiving the RAID PARTITION FAIL message for the first partition (disk.p1) uuid.

In some embodiments, the RAID instance may begin prefailing the container disk upon receiving the RAID_CONTAINER_DISK_FAIL_START message. In some embodiments, the RAID instance may perform SDC for partition 2. The RAID instance may submit a DISK_FAIL message to the storage partition module for partition 2 once SDC finishes. In some embodiments, the RAID instance on Node B may send the RAID instance on Node A a RAID_CONTAINER_DISK_FAIL_DONE message after failing partition 2. The RAID instance may send the storage a DISK_FAIL message for the container disk upon receiving a RAID_CONTAINER_DISK_FAIL_DONE message from Node A.

With regard to Scenario 3 of FIG. 7, the RAID instances in Node A and B may be unaware of the container disk or the partitions. Therefore, the RAID instances may be unaware of the disk failure.

With regard to Scenario 4 of FIG. 7, the container disk assigned to third party RAID instance in Node A and B may be unaware of the container disk or partitions. Therefore, the RAID instance may be unaware of the disk failure.

In some embodiments, SDC may not start on all partitions of a container disk due to resource constraints in some embodiments and so a non-volatile record may be created at the start of an SDC in some embodiments. In many embodiments, a reboot (e.g., due to a software bug) should not result in a partially failed partitioned disk requiring administrative intervention.

In some embodiments, the container disk slave may be required to prefail a disk when the container disk master is failing a disk. The slave is not able to write the old-label, so an FDR entry is used. In some of these embodiments the system may add an FDR entry at the start of SDC instead of writing to the old-label on the container disk.

Storage Disk Failure

Figure 9:
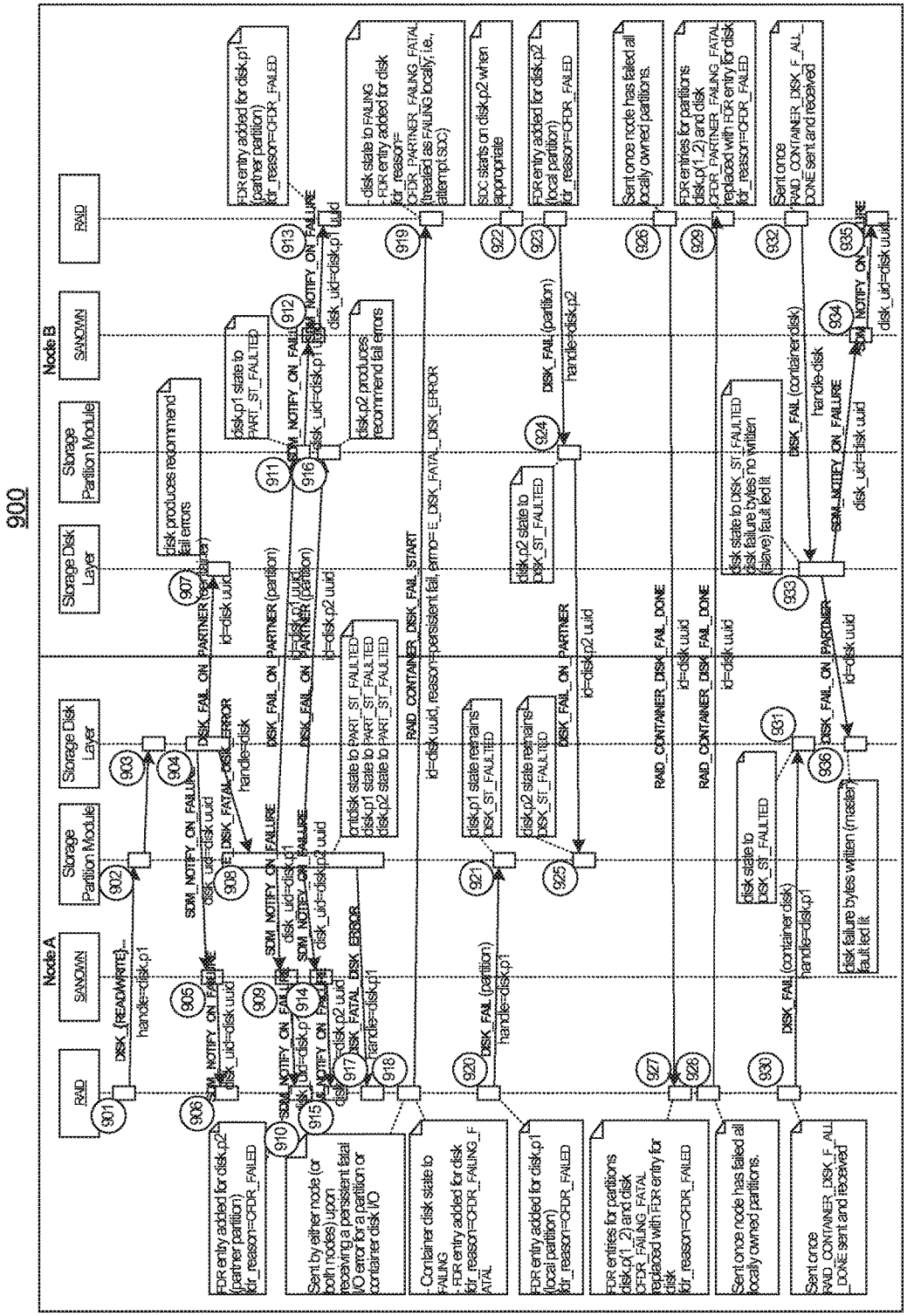
FIG. 9 is a sequence diagram illustrating a portion of a process for handling a storage disk failure at a shared storage device as may be implemented in some embodiments.

FIG. 9 is a sequence diagram illustrating a portion of a process for handling a storage disk failure at a shared storage device as may be implemented in some embodiments.

Disk Recommend Failure

Figure 10:
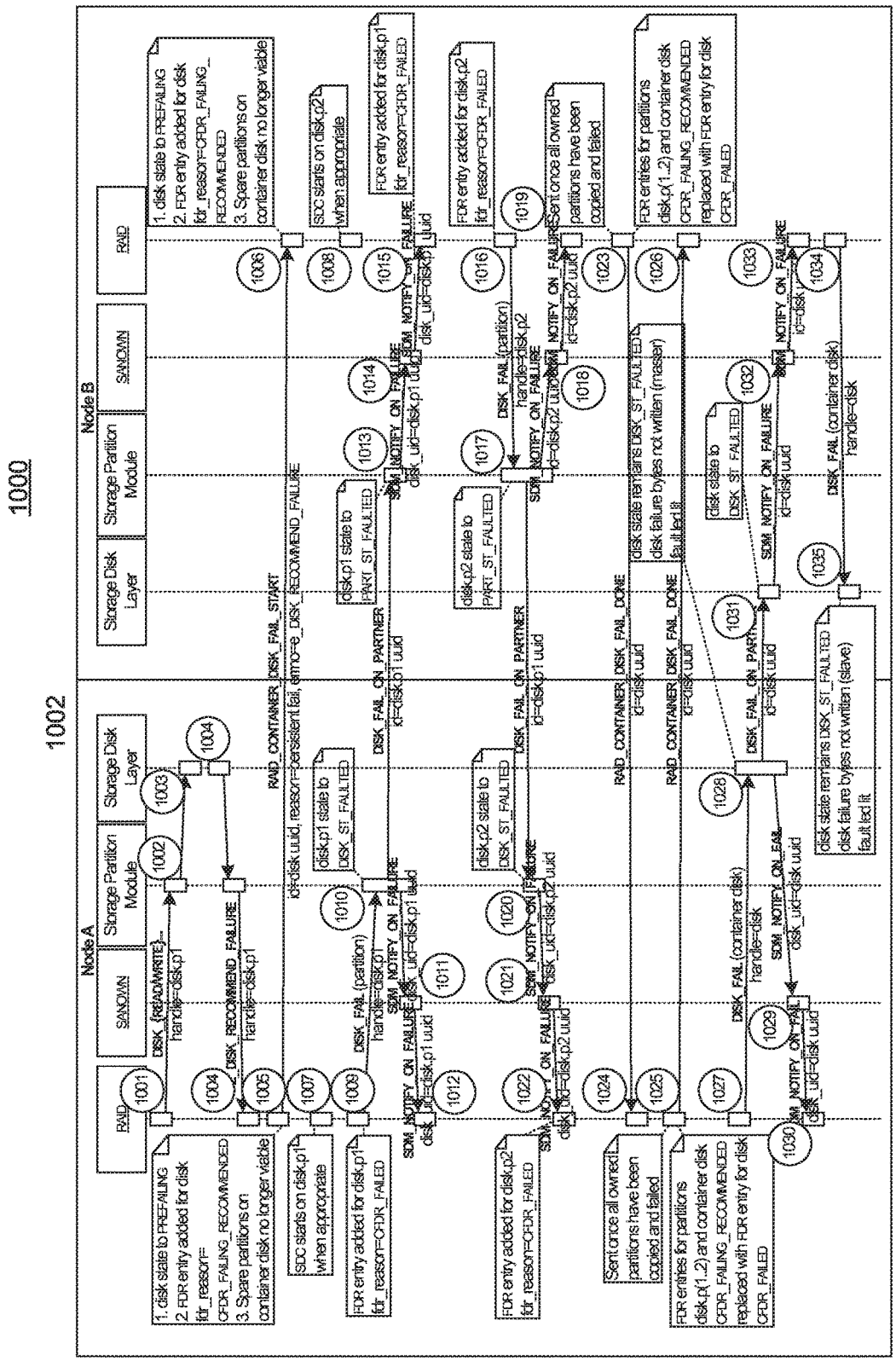
FIG. 10 is a sequence diagram illustrating a portion of a process for handling a recommend disk failure at a shared storage device as may be implemented in some embodiments.

FIG. 10 is a sequence diagram illustrating a portion of a process for handling a recommend disk failure at a shared storage device as may be implemented in some embodiments.

In some embodiments, the RAID instances are responsible for informing the partner of a failure recommendation, e.g. using the E_DISK_RECOMMEND_FAILURE message. In some embodiments, under normal circumstances, the RAID_CONTAINER_DISK_FAIL_START message may inform the partner RAID instance of the SDC start roughly simultaneously. In some embodiments, if a node panics or reboots, the FDR entry for PREFAILING the container disk may be used to resume SDC on all member partitions.

In some embodiments, when the cluster interconnection layer is lost, the file system manager on the storage device may send container disk state messages between the two nodes to keep state consistent across interconnect outages. In this manner communication may be maintained via the storage device even when the cluster interconnection layer fails.

In some embodiments, spare selection logic for partitions disks may be enhanced to allow each node to SDC copy partitions from a container disk to another container disk with spare partitions. Nodes may independently select disks with spare partitions as SDC targets. In some embodiments having configurations with two or more storage devices with spare partitions, nodes may independently select different SDC target disks. In some embodiments, a RAID instance may later reconcile the result of the SDCs to a single container disk.

Node Communication Storage Interconnect Failure (Non-Persistent Failure)

Figure 11:
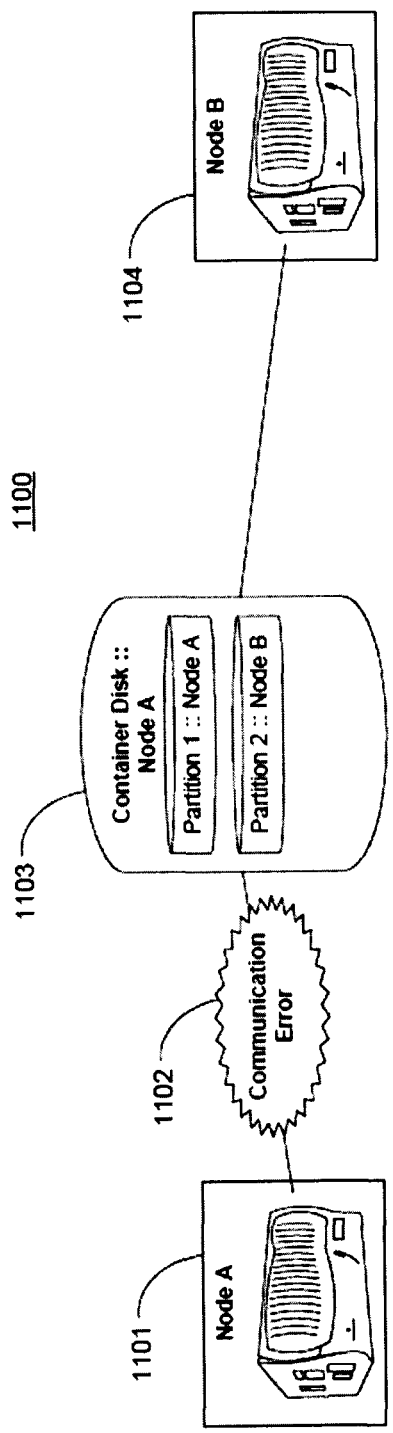
FIG. 11 is a generalized block diagram illustrating a communication failure in a storage system as may occur in some embodiments.

FIG. 11 is a generalized block diagram illustrating a communication failure in a storage system as may occur in some embodiments. A Node A 1101 and a Node B 1104 may be in communication with a storage device 1103. A communication error 1102 may prevent Node A, in whole or in part, from communicating with the storage device 1103.

Fatal Adapter Error

Figure 12:
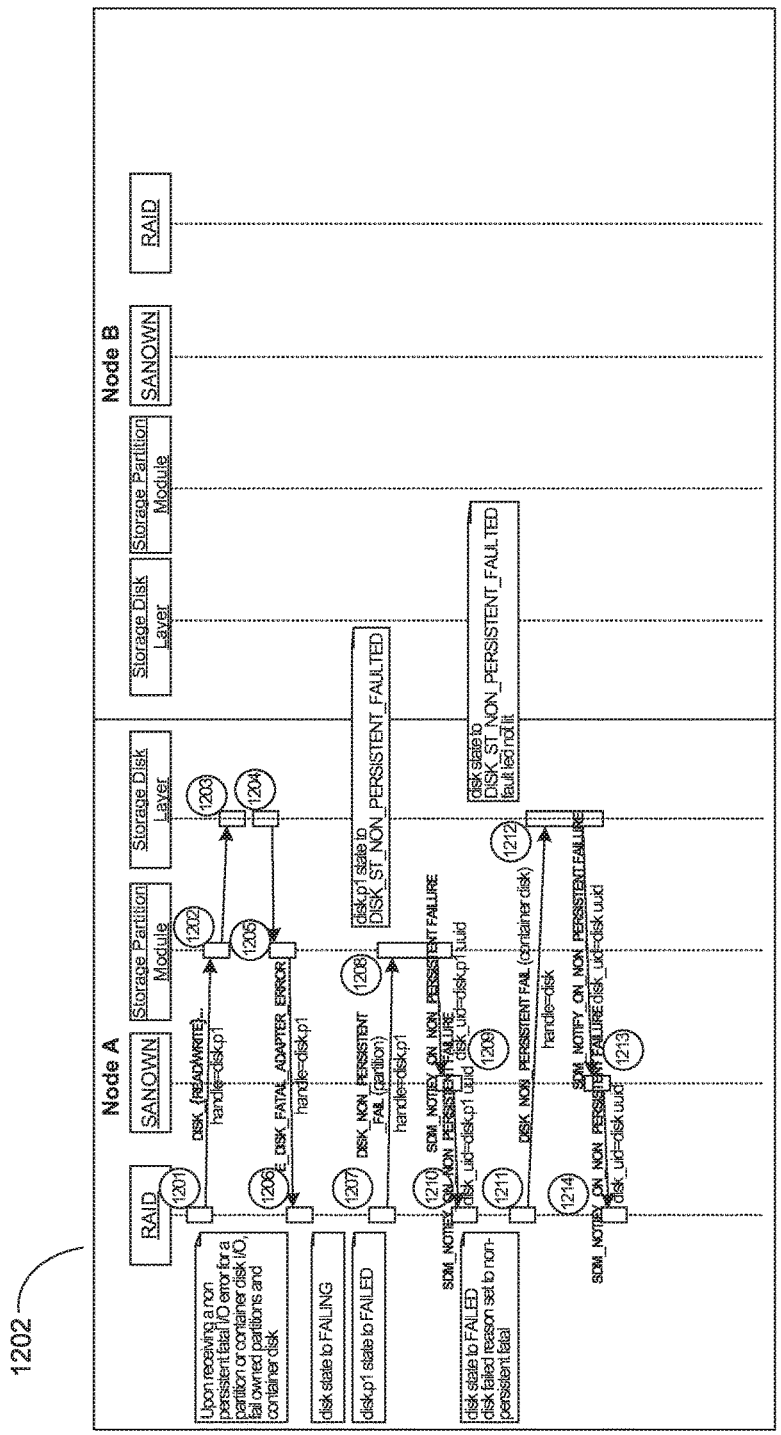
FIG. 12 is a sequence diagram illustrating a portion of a process for handling an adapter failure at a node as may be implemented in some embodiments.

FIG. 12 is a sequence diagram illustrating a portion of a process for handling an adapter failure at a node as may be implemented in some embodiments.

Figure 13:
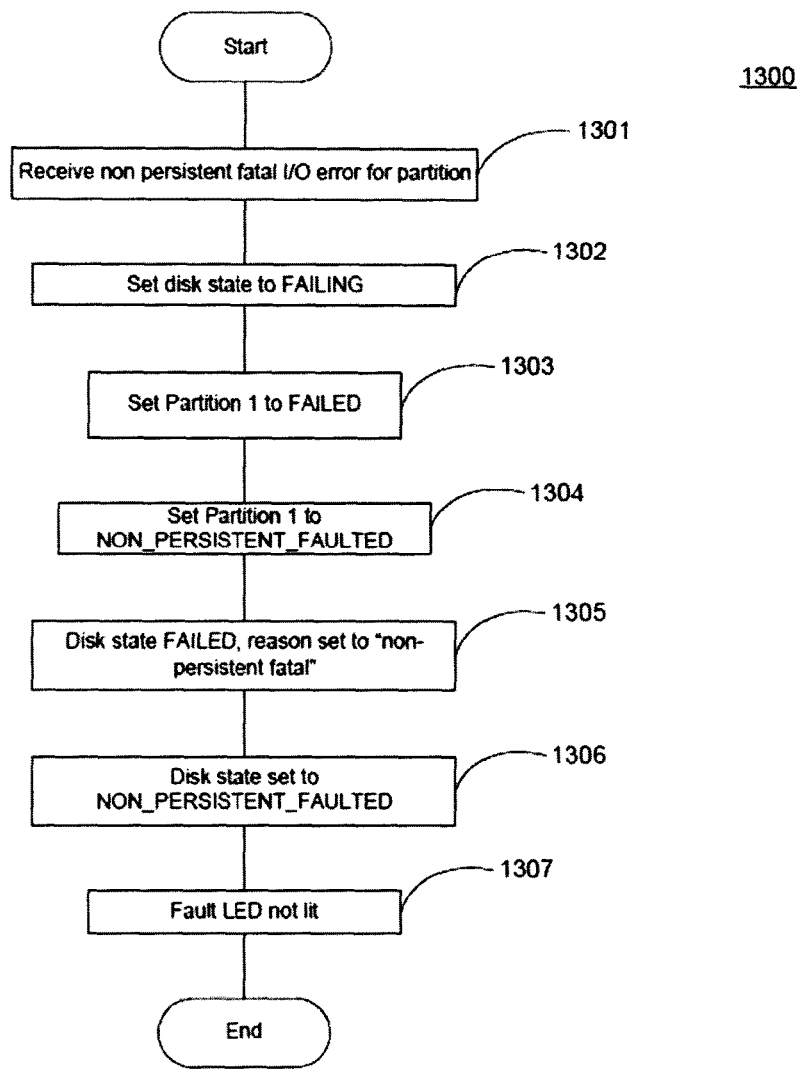
FIG. 13 is a flow diagram illustrating some operations of the adapter failure handling of FIG. 12 as may be implemented in some embodiments.

FIG. 13 is a flow diagram illustrating some operations of the adapter failure handling of FIG. 12 as may be implemented in some embodiments. At block 1301, Node A may receive a non-persistent fatal input/output error for a partition owned by Node A on the storage device.

At block 1302, Node A may set the disk's status to failing.

At block 1303, Node A may set Partition 1 to failed.

At block 1304, Node A may set Partition 1 to non-persistent faulted.

At block 1305, Node A may set the disk state to failed.

At block 1306, Node A may set the disk state to non-persistent faulted.

At block 1307, the fault indicator associated with the storage device may be disabled (or simply not enabled).

Disk Unfail Operation

Figure 14:
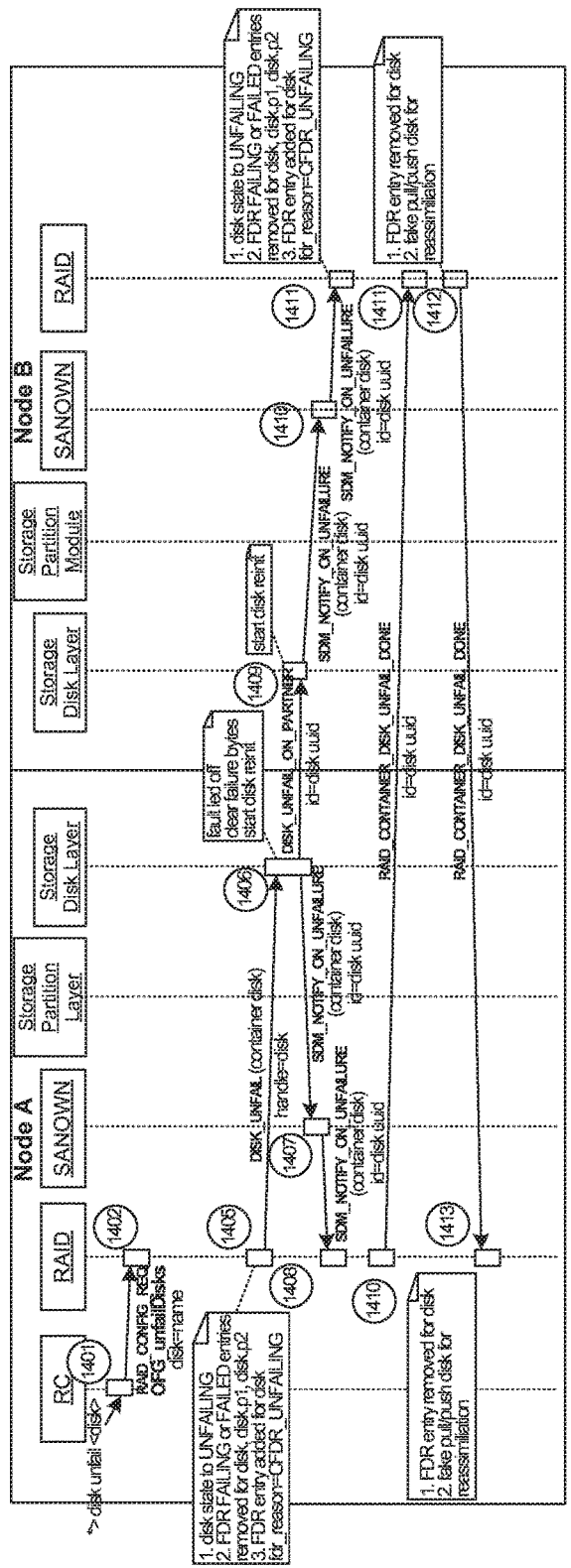
FIG. 14 is a sequence diagram for handling an "unfail" operation at a shared storage device as may be implemented in some embodiments.

FIG. 14 is a sequence diagram for handling an "unfail" operation at a shared storage device as may be implemented in some embodiments. A node may "unfail" a failed device to bring the storage back online in a harmonious manner with its partner node.

Disk Unfail Operation—Initiating Node

Figure 15:
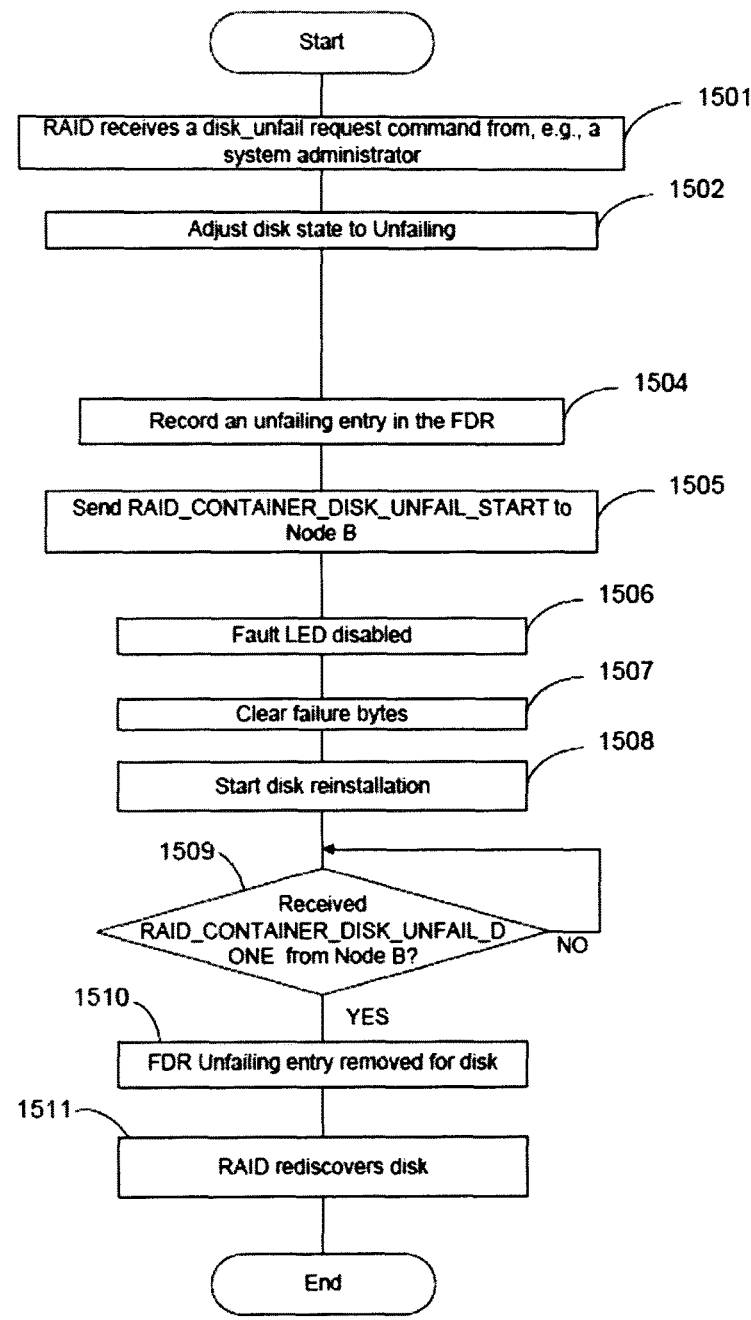
FIG. 15 is a flow diagram illustrating some operations at an initiating node for the unfail handling of FIG. 14 as may be implemented in some embodiments.

FIG. 15 is a flow diagram illustrating some operations at an initiating node, e.g. Node A, for the unfail handling of FIG. 14 as may be implemented in some embodiments. At block 1501, Node A may receive a disk_unfail request command from, e.g., a system administrator.

At block 1502, Node A may adjust the disk state to unfailing.

At block 1504, Node A may replace a failed entry with an unfailing entry in the FDR.

At block 1505, Node A may send a RAID container disk unfail start to Node B.

At block 1506, Node A may disable the fault indicator at the storage device.

At block 1507, Node A may clear the failure bytes.

At block 1508, Node A may start the disk reinitialization.

At block 1509, Node A may receive a RAID container unfail complete message from Node B.

At block 1510, Node A may remove the FDR unfailing entry.

At block 1511, the RAID system may rediscover the storage device disk.

Disk Unfail Operation—Receiving Node

Figure 16:
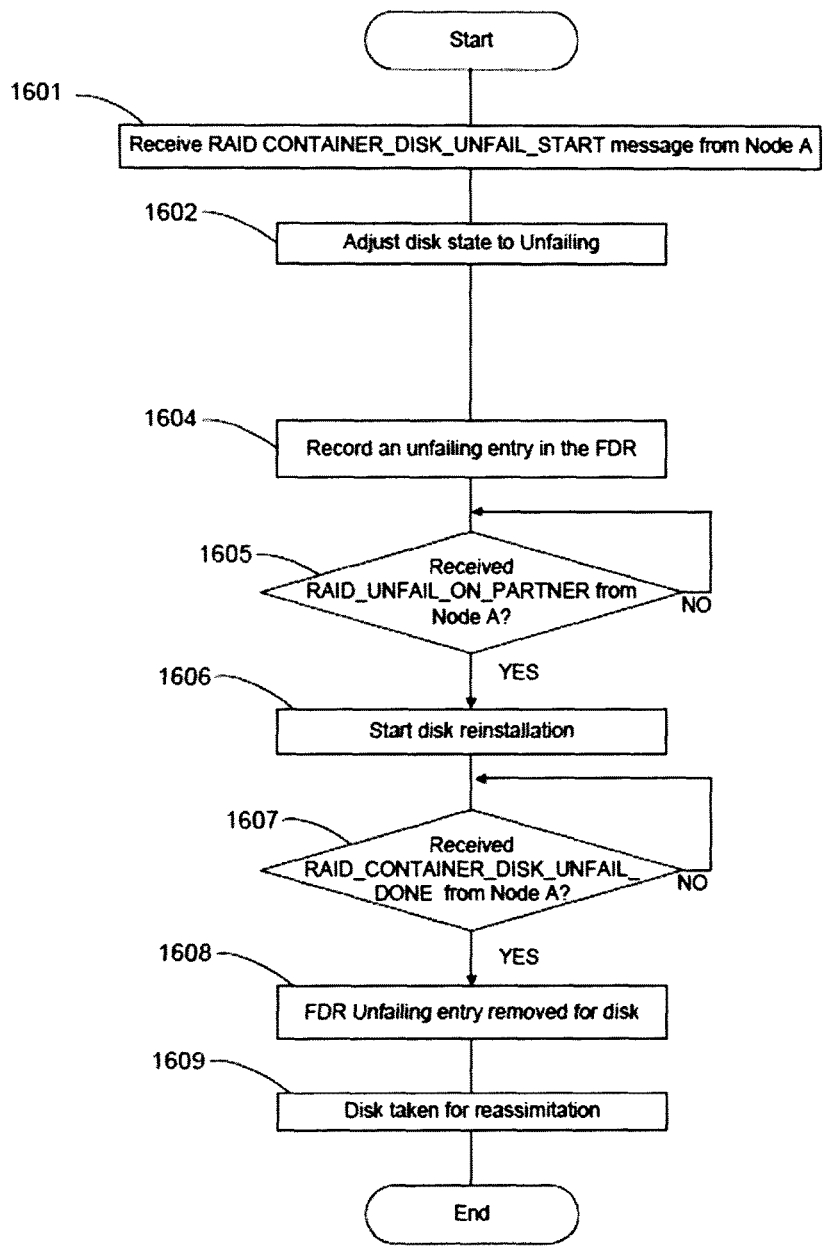
FIG. 16 is a flow diagram illustrating some operations at a receiving node for the unfail handling of FIG. 14 as may be implemented in some embodiments.

FIG. 16 is a flow diagram illustrating some operations at a receiving node for the unfail handling of FIG. 14 as may be implemented in some embodiments.

At block 1601, Node B may receive an unfail start message from Node A.

At block 1602, Node B may adjust the disk state to unfailing.

At block 1604, Node B may supersede a FAILED entry with an UNFAILING entry in the FDR, e.g., replacing a previous FAILED entry.

At block 1605, Node B may receive a partner unfail message. This message may have been sent at block 1505 in FIG. 15.

At block 1606, Node B may begin disk reinstallation.

At block 1607, Node B may receive a message indicating that the RAID container disk unfail operation is complete at Node A.

At block 1608, Node B may remove the unfailing entry at the FDR.

At block 1609, the storage device may be taken for reassimilation or otherwise managed to reintegrate with the storage system.

Computer System Overview

Figure 17:
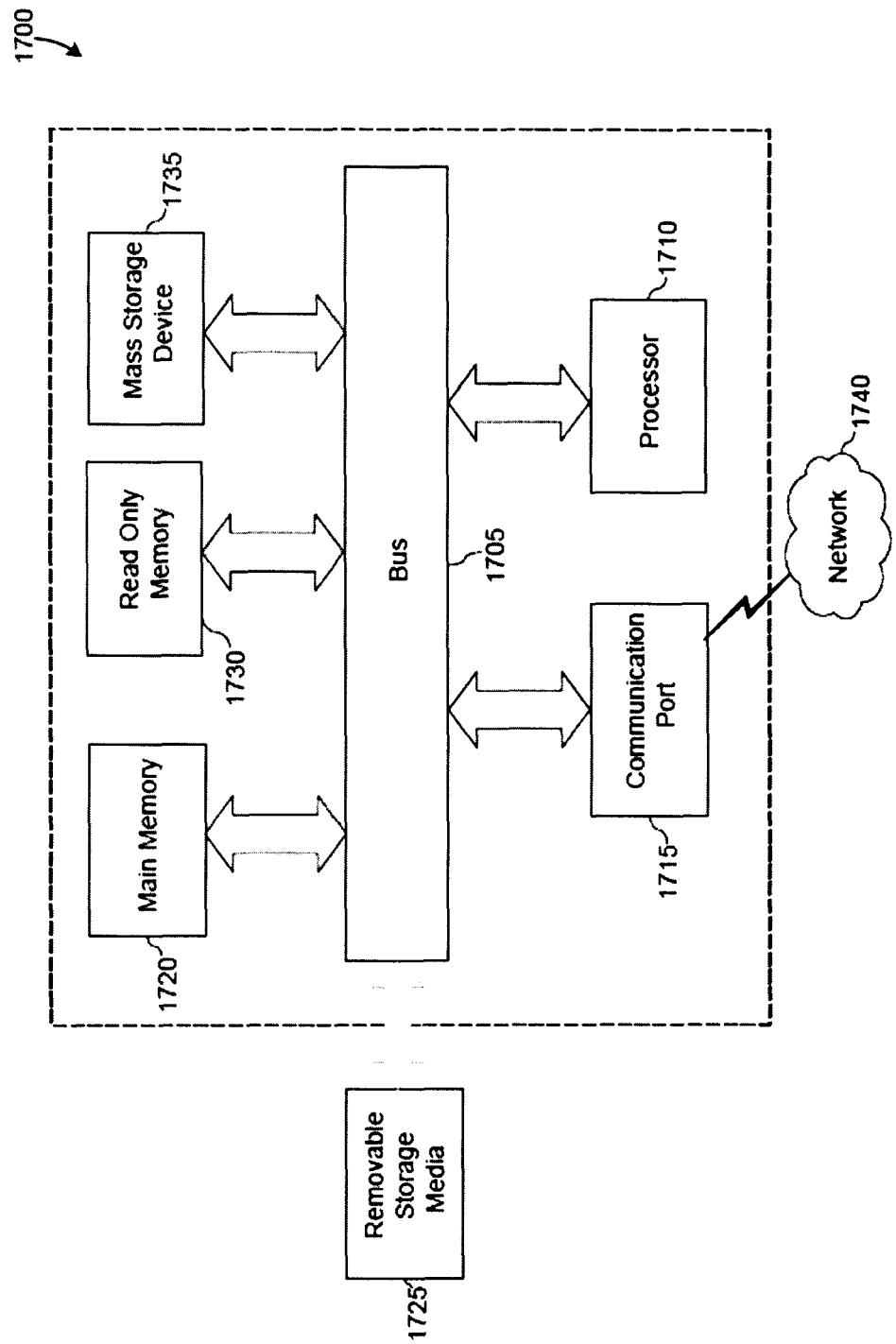
FIG. 17 is a block diagram of a computer system as may be used to implement features of some of the embodiments.

Various embodiments include various blocks and operations, which have been described above. A variety of these blocks and operations may be performed by hardware components or may be embodied in machine-executable instructions, which may be used to cause a general-purpose or special-purpose processor programmed with the instructions to perform the blocks. Alternatively, the blocks may be performed by a combination of hardware, software, and/or firmware. As such, FIG. 17 is a block diagram of a computer system 1700 as may be used to implement features of some of the embodiments. Various of the disclosed features may be located on computer system 1700. According to the present example, the computer system includes a bus 1705, at least one processor 1710, at least one communication port 1715, a main memory 1720, a removable storage media 1725, a read only memory 1730, and a mass storage 1735.

Processor(s) 1710 can be any known processor, such as, but not limited to, an Intel® Itanium® or Itanium 2® processor(s), or AMD® Opteron® or Athlon MP® processor(s), or Motorola® lines of processors. Communication port(s) 1715 can be any of an RS-232 port for use with a modem based dialup connection, a 10/100 Ethernet port, or a Gigabit port using copper or fiber. Communication port(s) 1715 may be chosen depending on a network such a Local Area Network (LAN), Wide Area Network (WAN), or any network to which the computer system 1700 connects.

Main memory 1720 can be Random Access Memory (RAM), or any other dynamic storage device(s) commonly known in the art. Read only memory 1730 can be any static storage device(s) such as Programmable Read Only Memory (PROM) chips for storing static information such as instructions for processor 1710.

Mass storage 1735 can be used to store information and instructions. For example, hard disks such as the Adaptec® family of SCSI drives, an optical disc, an array of disks such as RAID, such as the Adaptec family of RAID drives, or any other mass storage devices may be used.

Bus 1705 communicatively couples processor(s) 1710 with the other memory, storage and communication blocks. Bus 1705 can be a PCI/PCI-X or SCSI based system bus depending on the storage devices used.

Removable storage media 1725 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Remarks

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" may also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having blocks, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure. For example, although various blocks have been discussed in certain of the flow diagrams, one will recognize that additional blocks may be performed or depicted blocks omitted to accomplish similar functionality. In some instances optional elements may be indicated by dashed outlines in the flow diagrams, whereas in other elements the optionality may be explicitly stated in the text. One will recognize that many process blocks not explicitly indicated as being optional may also be optional depending upon the context. The illustrated example flow diagrams are provided for purposes of explanation rather than as limiting depiction of one or more embodiments. Accordingly the depicted blocks are illustrative.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limited the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method comprising:
    initiating, by a first node, a first disk failure procedure to perform failure processing on a shared storage device based upon an occurrence of an error associated with a disk partition within the shared storage device, wherein the error associated with the disk partition is undetected by a second node;
    sending an instruction to the second node to perform a second disk failure procedure upon the shared storage device; and
    providing an indication that the shared storage device is allowed to be replaced based upon the first disk failure procedure and the second disk failure procedure completing.

2. The method of claim 1, comprising:
    categorizing the error as a communication failure based upon a factor.

3. The method of claim 2, wherein the factor corresponds to a number of container disks associated with a failed state exceeding a threshold.

4. The method of claim 1, comprising:
    assigning a partition status to the disk partition, the partition status indicating that the disk partition has faulted.

5. The method of claim 1, comprising:
    assigning a disk status to the storage device, the disk status indicating that the storage device has failed.

6. The method of claim 1, comprising:
    performing a disk replacement operation for the shared storage device.

7. A computing device comprising:
    a memory containing computer-readable media having stored thereon instructions for performing a method; and
    a processor coupled to the memory, the processor configured to execute the instructions to cause the processor to:
        initiate, by a first node, a first disk failure procedure to perform failure processing on a shared storage device based upon an occurrence of an error associated with a disk partition within the shared storage device, wherein the error associated with the disk partition is undetected by a second node;
        send an instruction to the second node to perform a second disk failure procedure upon the shared storage device; and
        provide an indication that the shared storage device is allowed to be replaced based upon the first disk failure procedure and the second disk failure procedure completing.

8. The computing device of claim 7, wherein the shared storage device comprises a first partition and a second partition.

9. The computing device of claim 8, wherein the instructions cause the processor to:
    perform the first disk failure procedure upon the first partition of the shared storage device.

10. The computing device of claim 8, wherein the instruction instructs the second node to perform the second disk failure procedure upon the second partition.

11. The computing device of claim 9, wherein the instructions cause the processor to:
    associate the first partition with a failure state.

12. The computing device of claim 11, wherein the instructions cause the processor to:
    record the failure state in an on-disk database of state changes.

13. The computing device of claim 7, wherein the instructions cause the processor to:
    send a completion notification from the first node to the second node based upon the first node completing failure processing of local partitions, of the shared storage device, having failure states.

14. The computing device of claim 7, wherein the instructions cause the processor to:
    classify the error as a missing disk error.

15. The computing device of claim 7, wherein the instructions cause the processor to:
    generate a storage drive removal recommendation based upon the error.

16. The computing device of claim 7, wherein the instructions cause the processor to:
    create a record of a message exchange between the first node and the second node within an on-disk database of state changes based upon the instruction.

17. A non-transitory computer-readable storage media having stored thereon instructions, for performing a method, which causes a computing device to:
    initiate, by a first node, a first disk failure procedure to perform failure processing on a shared storage device based upon an occurrence of an error associated with a disk partition within the shared storage device, wherein the error associated with the disk partition is undetected by a second node;

send an instruction to the second node to perform a second disk failure procedure upon the shared storage device; and provide an indication that the shared storage device is allowed to be replaced based upon the first disk failure procedure and the second disk failure procedure completing.

18. The non-transitory computer-readable storage media of claim 17, wherein the shared storage device comprises a first partition and a second partition.

19. The non-transitory computer-readable storage media of claim 18, wherein the instructions cause the computing device to:

perform the first disk failure procedure upon the first partition of the shared storage device.

20. The non-transitory computer-readable storage media of claim 17, wherein the instructions cause the computing device to:

perform a disk replacement operation for the shared storage device.

* * * * *